United States Patent
Babu J D et al.

(10) Patent No.: US 10,939,084 B2
(45) Date of Patent: Mar. 2, 2021

(54) METHODS AND SYSTEM FOR GENERATING AND DISPLAYING 3D VIDEOS IN A VIRTUAL, AUGMENTED, OR MIXED REALITY ENVIRONMENT

(71) Applicant: MAGIC LEAP, INC., Plantation, FL (US)

(72) Inventors: Praveen Babu J D, Plantation, FL (US); Sean Christopher Riley, Delray Beach, FL (US)

(73) Assignee: Magic Leap, Inc., Plantation, FL (US)

( * ) Notice: Subject to any disclaimer, the term of this patent is extended or adjusted under 35 U.S.C. 154(b) by 12 days.

(21) Appl. No.: 16/225,553

(22) Filed: Dec. 19, 2018

(65) Prior Publication Data
US 2019/0199993 A1 Jun. 27, 2019

Related U.S. Application Data

(60) Provisional application No. 62/715,199, filed on Aug. 6, 2018, provisional application No. 62/610,112, filed on Dec. 22, 2017.

(51) Int. Cl.
| | |
|---|---|
| *H04N 13/122* | (2018.01) |
| *H04N 13/128* | (2018.01) |
| *G06T 19/00* | (2011.01) |
| *G06T 15/08* | (2011.01) |
| *H04N 13/279* | (2018.01) |
| *G06F 3/00* | (2006.01) |

(52) U.S. Cl.
CPC ............. *H04N 13/122* (2018.05); *G06F 3/00* (2013.01); *G06T 15/08* (2013.01); *G06T 19/006* (2013.01); *H04N 13/128* (2018.05); *H04N 13/279* (2018.05)

(58) Field of Classification Search
None
See application file for complete search history.

(56) References Cited

U.S. PATENT DOCUMENTS

| | | | |
|---|---|---|---|
| 9,417,452 B2 | 8/2016 | Schowengerdt et al. | |
| 9,671,566 B2 | 6/2017 | Abovitz et al. | |
| 2010/0128112 A1 | 5/2010 | Marti et al. | |
| 2011/0064388 A1* | 3/2011 | Brown | H04N 21/234318 386/285 |
| 2014/0002351 A1 | 1/2014 | Nakayama | |
| 2014/0028713 A1 | 1/2014 | Keating et al. | |
| 2014/0148733 A1* | 5/2014 | Stone | G16H 50/30 600/595 |

(Continued)

OTHER PUBLICATIONS

PCT International Search Report and Written Opinion for International Appln. No. PCT/US2018/066442, Applicant Magic Leap, Inc., forms PCT/ISA/210, 220, and 237, dated May 16, 2019.

*Primary Examiner* — Nurun N Flora
(74) *Attorney, Agent, or Firm* — Vista IP Law Group, LLP

(57) ABSTRACT

Disclosed is an approach for displaying 3D videos in a VR and/or AR system. The 3D videos may include 3D animated objects that escape from the display screen. The 3D videos may interact with objects within the VR and/or AR environment. The 3D video may be interactive with a user such that based on user input corresponding to decisions elected by the user at certain portions of the 3D video such that a different storyline and possibly a different conclusion may result for the 3D video. The 3D video may be a 3D icon displayed within a portal of a final 3D render world.

22 Claims, 11 Drawing Sheets

(56) References Cited

U.S. PATENT DOCUMENTS

| | | | |
|---|---|---|---|
| 2015/0358612 A1* | 12/2015 | Sandrew | H04N 13/261 |
| | | | 348/36 |
| 2016/0005228 A1* | 1/2016 | Niebla, Jr. | H04N 13/261 |
| | | | 348/43 |
| 2016/0284121 A1* | 9/2016 | Azuma | H04N 13/388 |
| 2017/0046879 A1* | 2/2017 | Severn | G06F 3/011 |
| 2017/0091996 A1 | 3/2017 | Wei et al. | |
| 2017/0315401 A1* | 11/2017 | Im | G06F 3/013 |
| 2018/0143756 A1* | 5/2018 | Mildrew | G06F 3/0482 |
| 2018/0160956 A1 | 6/2018 | Robaina et al. | |
| 2019/0066388 A1* | 2/2019 | Nakagawa | G06F 3/0416 |

* cited by examiner

METHODS AND SYSTEM FOR GENERATING AND DISPLAYING 3D VIDEOS IN A VIRTUAL, AUGMENTED, OR MIXED REALITY ENVIRONMENT

CROSS-REFERENCE TO RELATED APPLICATIONS

The present application claims benefit under 35 U.S.C. § 119 to U.S. Provisional Patent Application Ser. No. 62/610,112 filed on Dec. 22, 2017, entitled "METHODS AND SYSTEM FOR GENERATING AND DISPLAYING 3D VIDEOS IN A VIRTUAL, AUGMENTED, OR MIXED REALITY ENVIRONMENT," and also to U.S. Provisional Patent Application Ser. No. 62/715,199 filed Aug. 6, 2018 entitled "METHODS AND SYSTEM FOR GENERATING AND DISPLAYING 35 VIDEOS IN A VIRTUAL, AUGMENTED, OR MIXED REALITY ENVIRONMENT," which are all hereby incorporated by reference into the present application in their entirety.

The present disclosure is related to co-owned U.S. patent application Ser. No. 15/807,486, filed on Nov. 8, 2017 entitled "AUGMENTED AND VIRTUAL REALITY EYEWEAR, SYSTEMS, AND METHODS FOR DELIVERING POLARIZED LIGHT AND DETERMINING GLUCOSE LEVELS," which is hereby incorporated by reference in its entirety.

FIELD OF THE DISCLOSURE

The present disclosure generally relates to systems and methods configured to facilitate interactive virtual, augmented or mixed reality environments for one or more users.

BACKGROUND

Modern computing and display technologies have facilitated the development of systems for so-called "virtual reality" (VR), "augmented reality" (AR), or "mixed reality" (MR) experiences, where digitally reproduced images or portions thereof are presented to a user in a manner where they seem to be, or may be perceived as, real. A VR scenario typically involves presentation of digital or virtual image information without transparency to other actual real-world visual input, whereas an AR/MR scenario typically involves presentation of digital or virtual image information as an augmentation to visualization of the real world around the user such that the digital or virtual image (e.g., virtual content) may appear to be a part of the real world. Mixed reality may be analogous to an augmented reality scenario since a mixed reality scenario has a mixture of the real world and the digital world. AR may hereinafter refer to both AR and MR.

In a VR/AR environment, there are all sorts of virtual contents that need to be displayed. Virtual contents such as 3D videos may need to be displayed in the VR/AR environment. In the VR/AR environment, a user may be able to freely move around the VR/AR environment to view the 3D videos being displayed. Current techniques of rendering 3D videos to a display screen may not appear realistic when displayed in the VR/AR environment. Especially when these 3D videos may be interactable with the user.

Therefore, there is a need for an approach to generate and display 3D videos in a more realistic manner in a VR/AR environment.

SUMMARY

In accordance with some embodiments, one embodiment is directed to a method for displaying 3D video that extends beyond a surface of a display screen in a virtual and/or augmented reality environment, the method includes identifying a 3D video. Additionally, generating one or more 3D models corresponding to the 3D video, and rendering the one or more 3D models at an appropriate trigger time along with a rendering of the 3D video.

In one or more embodiments, the 3D video is a stereoscopic 3D video, wherein the one or more 3D models are generated with animations. The method may further include displaying the animations of the one or more 3D models outside of a display screen, at least in part, of the 3D video, wherein the animations of the one or more 3D models appear to exit a planar surface of the 3D video and come out into a 3D environment of a user. The animations of the one or more 3D models may appear to exit a non-planar surface of the 3D video and come out into a 3D environment of a user. The method may yet further include rendering one or more 3D models onto one or more video panes, and displaying the one or more video panes at a same time for one or more viewing orientations.

In one or more embodiments, the stereoscopic 3D video is displayed with the one or more 3D models, the depth information comprising a distance from a user of a virtual and/or augmented reality device to the 3D video and respective one or more 3D models displayed within a virtual and/or augmented reality environment. The 3D video may have a video file format comprising control data, wherein the control data instructs a video player to render the one or more 3D models at the appropriate trigger time along with the rendering of the 3D video. The rendering of the one or more 3D models is based at least in part on a Voxel based video stream.

Some embodiments are directed to a display system for displaying 3D video that extends beyond a surface of a display screen, the system includes an augmented reality head-mounted display system, and one or more modules for processing data, wherein the one or more modules are stored in one or more memory, the one or more modules may be configured to perform identifying a 3D video. The one or more modules may also be configured to perform generating one or more 3D models corresponding to the 3D video. The one or more modules may also be configured to perform rendering the one or more 3D models at an appropriate trigger time along with a rendering of the 3D video.

In one or more embodiments of the display system, the 3D video is a stereoscopic 3D video, wherein the one or more 3D models are generated with animations. The method may further include displaying the animations of the one or more 3D models outside of a display screen, at least in part, of the 3D video, wherein the animations of the one or more 3D models appear to exit a planar surface of the 3D video and come out into a 3D environment of a user. The animations of the one or more 3D models may appear to exit a non-planar surface of the 3D video and come out into a 3D environment of a user. The method may yet further include rendering one or more 3D models onto one or more video panes, and displaying the one or more video panes at a same time for one or more viewing orientations.

Some embodiments are directed to a video file format that may include one or more more animation streams, a data store, and at least one of a video stream or an audio stream.

One embodiment is directed to a method that includes identifying a portal in a 3D render world, the portal being an opening in a planar surface of the 3D render world. In addition, a first 2D stereoscopic image and a second 2D stereoscopic image may be rendered into the portal of the 3D render world.

In one or more embodiments, the rendered 3D render world may be rendered to a user through an augmented reality device. The first 2D stereoscopic image is for a right eye and the second 2D stereoscopic image is for a left eye. In one embodiment, the first 2D stereoscopic image and the second 2D stereoscopic image are sourced from a traditional 3D video (e.g., a 3D movie). In a different embodiment, the first 2D stereoscopic image and the second 2D stereoscopic image are sourced from two virtual render cameras located within a different part of the 3D render world.

In one or more embodiments, the first 2D stereoscopic image and the second 2D stereoscopic image are sourced from two cameras capturing real world content. In a different embodiment, the first 2D stereoscopic image and the second 2D stereoscopic image are sourced from a different 3D render world. In some embodiments, the portal can be displayed as a portal icon, or as a virtual television screen.

Another embodiment is directed to a computer implemented method for displaying 3D video in a virtual and/or augmented reality environment, the method includes identifying a 3D video. The method also includes identifying a volume space for displaying a 3D video in a portion of a virtual and/or augmented reality environment. And rendering, by a 3D media player, the 3D video within the volume space.

In one or more embodiments, the 3D video is a stereoscopic 3D video. The volume space is a portal view of a 3D object, wherein the 3D object is a virtual television having a planar viewing display. The 3D video is rendered within the planar viewing display of the virtual television. A first depth information from the 3D video is added to a second depth information from a first location of the portion of the virtual and/or augmented environment volume space to a second location of a user viewing the 3D video.

Another embodiment is directed to a 3D video that may be rendered to display in a portion of volume space within a virtual and/or augmented reality environment. The 3D video may include 3D objects that escape the screen. The 3D video may interact with the virtual and/or augmented reality environment. The 3D video may be interactive with a user such that a different storyline conclusion may result for the 3D video, based on user input which may affect the storyline.

Another embodiment is directed to a method that includes placing two first stage cameras in a 3D environment. Additionally, the method may include capturing one or more pairs of 2D images from the two first stage cameras. Furthermore, the method may include placing the one or more pairs of 2D images into a location within a final stage scene (sometimes alternatively called a final 3D render world). And, the method may include, rendering the final stage scene from two final stage cameras.

In one or more embodiments, the method may also include comprising displaying the final stage scene via a virtual and/or augmented reality device. The display location may be a portal. A first camera of the two first stage cameras captures a 2D image from a left eye perspective and a second camera of the two first stage cameras captures a 2D image from a right eye perspective. The one or more other pairs of two 2D images may be captured from two final stage cameras corresponding to two eyes of the user.

In one or more embodiments, the 2 first stage cameras are in different locations of the 3D environment than the final stage 2 render cameras. The two first stage cameras may be virtual cameras and the 3D environment may be a 3D virtual world. The 3D environment may be a digital representation of a real world.

Another embodiment is directed to a method that includes placing a first 3D content from a first source into a second 3D content from a second source. In one or more embodiments, the method may also include displaying the second 3D content via a virtual and/or augmented reality device. The first 3D content may be placed into a portal within the second 3D content. A first camera of the first source captures a 2D image from a left eye perspective and a second camera of the first source captures a 2D image from a right eye perspective.

In one or more embodiments, another pair of two 2D images is captured from two other cameras from the second source, the pair of two 2D images corresponding to two eyes of a user viewing a scene from the second source. Two cameras from the first source are in different locations of the 3D environment than the two other cameras from the second source. The first 3D content may be captured from two virtual cameras and the first source may be a 3D virtual world. In some embodiments, the first source may be the real world.

Another embodiment is directed to a method that includes placing a first set of stereoscopic images inside a second set of stereoscopic images. In one or more embodiments, the method may also include displaying the second set of stereoscopic images via a virtual and/or augmented reality device. The first set of stereoscopic images are placed into a portal within the second set of stereoscopic images. The first set of stereoscopic images are captured by a first camera that may capture 2D images from a left eye perspective and a second camera that may capture 2D images from a right eye perspective.

In one or more embodiments, the second set of stereoscopic images are captured by two other cameras, the two other cameras capturing the second set of stereoscopic images, the two other cameras may correspond to two eyes of a user viewing a scene showing the first set of stereoscopic images in a portal. The first set of stereoscopic images may be captured from two cameras from a different location than the two other cameras capturing the second set of stereoscopic images. The first set of stereoscopic images may be captured from two virtual cameras in a 3D virtual world. The first set of stereoscopic images may be captured from two cameras in a real world.

Some embodiments are directed to a method that includes identifying two input images, wherein one input image may correspond to a left eye perspective and a second input image may correspond to a right eye perspective. Additionally, the method may also include placing the two input images into a specified location within a final 3D render world. In one or more embodiments, the method may also include displaying the final 3D render world via a virtual and/or augmented reality device. The specified location may be a portal within the final 3D render world. The two input images may be captured by a first camera that captures 2D images from a left eye perspective and a second camera that captures 2D images from a right eye perspective.

In one or more embodiments, the final 3D render world may be captured by two other cameras, the two other cameras capturing the final 3D render world, the two other cameras corresponding to two eyes of a user viewing a scene showing the two input images in a portal. The two input images may be captured from two cameras from a different location than the two other cameras capturing the final 3D render world. The two input images may be captured from two virtual cameras in a 3D virtual world. The two input images may be captured from two cameras in a real world.

Some embodiments are directed to a method that includes identifying a 3D data input. Furthermore, the method may also include placing the 3D data input into a location within a virtual final 3D render world. In one or more embodiments, the method may also include displaying the virtual final 3D render world via a virtual and/or augmented reality device. The location may be a portal within the virtual final 3D render world. The 3D data input may be captured by a first camera that captures 2D images from a left eye perspective and a second camera that may capture 2D images from a right eye perspective.

In one or more embodiments, the virtual final 3D render world may be captured by two other cameras, the two other cameras capturing the virtual final 3D render world, the two other cameras corresponding to two eyes of a user viewing a scene showing the 3D data input in a portal. The 3D data input may be captured from two cameras from a different location than the two other cameras capturing the virtual final 3D render world. The 3D data input may be captured from two virtual cameras in a 3D virtual world. The 3D data input may be captured from two cameras in a real world.

Some embodiments are directed to a video file format, the video file format may include one or more animation streams, a data store, and at least one of a video stream or an audio stream. In one or more embodiments, the data store may include one or more control data, one or more 3D models, one or more textures, and one or more materials. The control data may be fully loaded into memory when an application reading the video file format is first accessed. A control stream may be preloaded into memory from one or more control data from the data store when the control data is fully loaded into memory. The control stream may be configured to look more ahead into time corresponding to a timeline than the video streams or the audio streams.

In one or more embodiments, the control stream may comprise commands and/or simple logic gates to determine a combination of a model and an animation to play at an appropriate time within a timeline of the video. The appropriate time within the timeline of the video corresponds with a corresponding time of a video stream and an audio stream. The control stream comprises key frames. The animation stream, the video stream, and the audio stream may be configured to look ahead and behind one key frame. The one or more animation streams may correspond to animation instructions associated to one or more 3D models. Each animation stream of the one or more animation streams may correspond to at least one of a 3D model, a texture, or a material of the data store.

Some embodiments are directed to a method that includes receiving a video file of a video, the video file may include one or more animation streams, a data store comprising control data, and at least one of a video stream or an audio stream. The method may also include dynamically generating a control stream from the control data and a timeline controller. Additionally, the method may include loading a model of a 3D object received from the data store. The method may also include attaching the 3D object to an animation stream of the one or more animation streams.

In one or more embodiments, the one or more animation streams correspond to respective 3D models stored within a data store. The one or more animation streams may control movements, orientation, and/or positions of 3D objects relative to the video. The model of the 3D object may be loaded based at least in part on the control stream looking ahead in time of the video streams and anticipating when the 3D object needs to be displayed.

In one or more embodiments, the method may also include determining a lead time for loading the model based at least on one of a size of the model, a network bandwidth, or processing power of a user's virtual and/or augmented reality system. Additionally, the method may also include displaying the video via a virtual and/or augmented reality device. The data store may be fully loaded into memory when the video file is received. The control stream may be fully loaded into memory when the control stream is generated. The video may be a stereoscopic 3D video.

Some embodiments are directed to a computer system implementing a mixed reality video player that includes a computer processor to execute a set of program code instructions, and a memory to hold the program code instructions, in which the program code instructions may include program code to perform receiving a video file of a video, the video file may include one or more animation streams, a data store comprising control data, and at least one of a video stream or an audio stream. The program code instructions may also include program code to perform dynamically generating a control stream from the control data and a timeline controller. The program code instructions may further include program code to perform loading a model of a 3D object received from the data store. The program code instructions may also further include program code to perform attaching the 3D object to an animation stream of the one or more animation streams.

Another embodiment is directed to a method that includes receiving a video file of a video, the video file may include one or more animation streams, a data store comprising control data, and at least one of a video stream or an audio stream. The method may also include dynamically generating a control stream from the control data and a timeline controller. Additionally, the method may also include requesting a user interaction answering a question displayed to the user at a point in time of the video. Furthermore, the method may also include receiving an answer to the question via the user interaction. The method may also include notifying a timeline controller of the answer. Yet furthermore, the method may also include skipping to an appropriate portion of the video corresponding to the answer. The method may also include displaying the video from the appropriate portion.

In one or more embodiments, the method may also include displaying the video via a virtual and/or augmented reality device. The data store may be fully loaded into memory when the video file is received. The control stream may be fully loaded into memory when the control stream is generated. The video may be a stereoscopic 3D video. The control stream may control when to display a question to the user at a specific point in time of the video, based at least in part on data from the data store.

In one or more embodiments, the user interaction comprises at least one of a head pose, an eye tracking, an eye gaze, hand gestures of the user, totem gestures, or an object recognizer. The timeline controller controls a position of the video stream. The method may also include storing a state of the video with a runtime interactivity data based at least in part on the answer received. The question displayed to the user corresponds to questions that changes how a storyline of the video may end.

Some embodiments are directed to a computer system implementing a mixed reality video player, that includes a computer processor to execute a set of program code instructions, and a memory to hold the program code instructions, in which the program code instructions include program code to perform receiving a video file of a video, the video file includes one or more animation streams, a data store comprising control data, and at least one of a video stream or an audio stream. The program code instructions may also include program code to perform dynamically generating a control stream from the control data and a timeline controller, requesting a user interaction answering a question displayed to the user at a point in time of the video, receiving an answer to the question via the user interaction, notifying a timeline controller of the answer, skipping to an appropriate portion of the video corresponding to the answer, and displaying the video from the appropriate portion.

In one or more embodiments, the program code instructions may also include program code to perform displaying the video via a virtual and/or augmented reality device. The data store may be fully loaded into memory when the video file is received. The control stream may be fully loaded into memory when the control stream is generated. The video may be a stereoscopic 3D video. The control stream may control when to display a question to the user at a specific point in time of the video, based at least in part on data from the data store.

In one or more embodiments, the user interaction comprises at least one of a head pose, an eye tracking, an eye gaze, hand gestures of the user, totem gestures, or an object recognizer. The timeline controller controls a position of the video stream. The method may also include storing a state of the video with a runtime interactivity data based at least in part on the answer received. The question displayed to the user corresponds to questions that changes how a storyline of the video may end.

Another embodiment is directed to a method for displaying an environment aware 3D video in a virtual and/or augmented reality environment, the method includes identifying a 3D video. The method also includes receiving, from one or more sensors, environment information of a user environment, the environment information identifying objects within the environment. The method may further include rendering a portion of the 3D video onto one or more objects identified from the environment.

In one or more embodiments, the 3D video is a stereoscopic 3D video. The environment may be a physical environment of the user. The one or more sensors comprise one or more cameras for capturing scene information of the physical environment. The method further includes interpreting scene information captured from the one or more sensors and mapping one or more elements of the environment by detecting and registering the one or more elements from the environment. The 3D video has a video file format comprising control data, wherein the control data instructs a video player to display the portion of the 3D video onto the one or more objects identified from the environment.

Some embodiments are directed to a virtual and/or augmented reality display system that includes a camera to capture a virtual and/or augmented reality environment, and a module for processing data, wherein the module is stored in a memory, the module when executed, performs a process of identifying a 3D video, receiving, from one or more sensors, environment information of a user environment, the environment information identifying objects within the environment, and rendering a portion of the 3D video onto one or more objects identified from the environment.

In one or more embodiments, the 3D video is a stereoscopic 3D video. The environment may be a physical environment of the user. The one or more sensors comprise one or more cameras for capturing scene information of the physical environment. The method further includes interpreting scene information captured from the one or more sensors and mapping one or more elements of the environment by detecting and registering the one or more elements from the environment. The 3D video has a video file format comprising control data, wherein the control data instructs a video player to display the portion of the 3D video onto the one or more objects identified from the environment.

Some embodiments are directed to a method for displaying interactive 3D video in a virtual and/or augmented reality environment, the method includes identifying a 3D video as a stream of non-executable data periodically interrupted by decision nodes. Furthermore, the method includes receiving one or more interactions from a user as input corresponding to decisions elected by the user. The method may also include rendering the 3D video based at least on the decisions elected by the user.

In one or more embodiments, the 3D video is a stereoscopic 3D video. The 3D video may have a video file format comprising control data, wherein the control data instructs a video player to render portions of the 3D video based at least in part on the decisions elected by the user. The one or more interactions received from the user include at least one of a head pose, an eye-tracking, gestures, totem gestures, or object recognizer. An interaction from the one or more interactions received from the user jumps the 3D video to a different part of the 3D video.

Some embodiments are directed to a virtual and/or augmented reality display system that includes a camera to capture a virtual and/or augmented reality environment, and a module for processing data, wherein the module is stored in a memory, the module when executed, performs a process of identifying a 3D video as a stream of non-executable data periodically interrupted by decision nodes, receiving one or more interactions from a user as input corresponding to decisions elected by the user, and rendering the 3D video based at least on the decisions elected by the user.

In one or more embodiments, the 3D video is a stereoscopic 3D video. The 3D video may have a video file format comprising control data, wherein the control data instructs a video player to render portions of the 3D video based at least in part on the decisions elected by the user. The one or more interactions received from the user include at least one of a head pose, an eye-tracking, gestures, totem gestures, or object recognizer. An interaction from the one or more interactions received from the user jumps the 3D video to a different part of the 3D video.

Some embodiments are directed to a method for displaying 3D objects, the method may include storing graphical data representing a 3D object in a database. The method may further include displaying a 2D opaque pane comprising a viewing aperture for viewing the 3D object located behind the 2D opaque pane, rendering a first portion of the 3D object viewable through the viewing aperture from a first perspective, receiving a request to display the 3D object viewable through the viewing aperture from a second viewing perspective, rendering a second portion of the 3D object viewable through the viewing aperture from a second perspective, and displaying the second portion of the 3D object from the second perspective.

In one or more embodiments, the graphical data representing the 3D object is a complete representation of the entire 3D object. The rendering of the first portion of the 3D object may be based at least in part on a viewing angle relative to a field of view of the 3D object from the first perspective. The rendering of the second portion of the 3D object may be based at least in part on a viewing angle relative to a field of view of the 3D object from the second perspective. The opaque pane may further comprise a plurality of viewing apertures for viewing a plurality of 3D objects located behind the 2D opaque pane.

In one or more embodiment, each 3D object of the plurality of 3D objects is located behind a respective viewing aperture. The 3D object may be an 3D icon. The 2D opaque pane comprising the viewing aperture may be an icon grid for displaying a plurality of 3D icons. The 3D object may move through the viewing aperture as a user gazes at the 3D object. The 3D object may be displayed as a 2D image when a user is not focusing on the 3D object.

Additional and other objects, features, and advantages of the disclosure are described in the detail description, figures and claims.

BRIEF DESCRIPTION OF THE DRAWINGS

The drawings illustrate the design and utility of preferred embodiments of the present disclosure, in which similar elements are referred to by common reference numerals. In order to better appreciate how the above-recited and other advantages and objects of the present disclosure are obtained, a more particular description of the present disclosure briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings.

The drawings use like reference numerals to identify like elements. A letter after a reference numeral, such as "120a," indicates that the text refers specifically to the element having that particular reference numeral. A reference numeral in the text without a following letter, such as "120," refers to any or all of the elements in the drawings bearing that reference numeral (e.g. "120" in the text refers to reference numerals "120a" and/or "120b" in the drawings).

DETAILED DESCRIPTION

Figure 1:
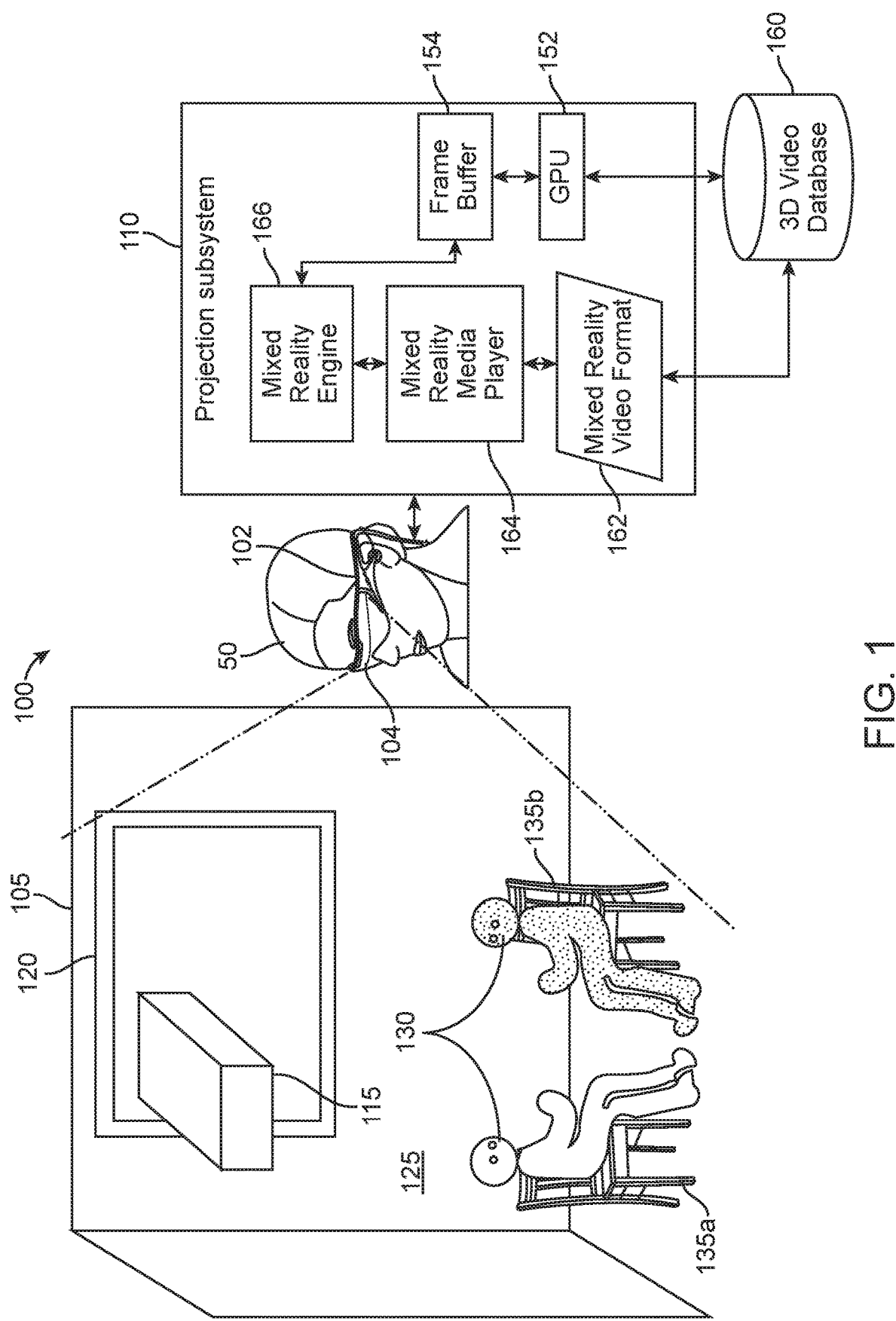
FIG. 1 shows an example user physical environment and augmented reality system for displaying 3D videos in an AR environment, according to some embodiments.

The present disclosure is directed to generating and displaying 3D videos in a VR, MR, and/or AR system. The 3D videos may include 3D objects that appear to escape from the screen. The 3D video may interact with objects within the virtual reality (VR), mixed reality (MR), augmented reality (AR), and/or real environment. The 3D video may be interactive with the user such that, based on user input corresponding to decisions elected by the user at certain portions of the 3D video, a different storyline and possibly a different conclusion may result for the 3D video. The 3D video may be a 3D icon displayed within a portal of a final 3D render world.

This disclosure provides a description of an illustrative augmented reality (AR) system with which some embodiments of the disclosure may be practiced, followed by a description of one or more embodiments of processes and mechanisms to generate and display the 3D videos in the illustrative AR system.

Illustrative Augmented Reality System and Environment

The description that follows pertains to an illustrative AR system with which the disclosure may be practiced. However, it is to be understood that the disclosure also lends itself to applications in other types of AR, MR, and virtual reality (VR) systems, and therefore the disclosure is not to be limited to only the illustrative system disclosed herein.

Referring to Figure (FIG.) 1, one embodiment of an AR system 100 constructed in accordance with present disclosure is described. The AR system 100 may be operated in conjunction with an AR projection subsystem 110, which may provide 3D videos in a field of view of an end user 50 (hereinafter referred to as "user 50"). This approach employs one or more eye pieces that may include at least partially transparent surfaces through which an ambient environment such as a user's physical environment/landscape 105 can be seen and augmented with images of virtual content (e.g., a 3D video, virtual objects, etc.).

The AR system 100 includes a frame structure 102 worn by the user 50, a display system 104 carried by the frame structure 102, such that the display system 104 is positioned in front of eyes of the user 50.

The display system 104 is configured to present the eyes of the user 50 with photo-based radiation patterns that can be comfortably perceived as augmentations to physical reality with both two-dimensional and three-dimensional content. The display system 104 presents a sequence of frames at high frequency that provides the perception of a single coherent scene that mingles real and virtual content. To this end, the display system 104 includes a projection subsystem 110 and an eye piece, for example, in a pair of glasses that may be a partially transparent surface on which or through which the projection subsystem 110 projects images. The eye piece is positioned in the user's 50 field of view between the eyes of the user 50 and an ambient environment. In some embodiments, the eye piece may be a fully transparent surface, partially transparent surface, or translucent surface such that the user 50 can see at least part of the user's real world/ambient environment while wearing the display system 104.

In some embodiments, the projection subsystem 110 may take the form of a scan-based projection device and the eye piece may take the form of a waveguide-based display into which light from the projection subsystem 110 is injected to produce, for example, images at a single optical viewing distance closer than infinity (e.g., arm's length), images at multiple optical viewing distances or focal planes, and/or image layers stacked at multiple viewing distances or focal planes to represent volumetric 3D objects. Layers in a light field may be stacked closely enough together to appear continuous to a human visual system (e.g., one layer is within a cone of confusion of an adjacent layer). Layers in a light field may be stacked at pre-determined depth intervals to create depth planes at discrete viewing distances, and utilized one at a time, or in combination. Additionally, or alternatively, picture elements may be blended across two or more layers to increase perceived continuity of transition between layers in the light field, even if those layers are more sparsely stacked (e.g., one layer is outside a cone of confusion of an adjacent layer). The display system 104 may be monocular or binocular. A scanning assembly includes one or more light sources that produce one or more light beams (e.g., emit light in a plurality of colors in defined patterns). The light sources may take any of a large variety of forms, for instance, a set of RGB sources (e.g., laser diodes capable of outputting red, green, and blue light) operable to respectively produce red, green, and blue coherent collimated light according to defined pixel patterns specified in respective frames of pixel information or data. Laser light provides high color saturation and is highly energy efficient. In some embodiments, light emitting diodes (LEDs) may be used, and the light may not be collimated. An optical coupling subsystem includes an optical waveguide input apparatus, such as, for example, one or more reflective surfaces, diffraction gratings, mirrors, dichroic mirrors, or prisms to optically couple light into the end or edge or side of the eye piece. The optical coupling subsystem may further include a collimation element that collimates light from the optical fiber.

Optionally, the optical coupling subsystem includes an optical modulation apparatus configured for converging the light from the collimation element towards a focal point in a center of the optical waveguide input apparatus, thereby allowing the size of the optical waveguide input apparatus to be minimized. Thus, the display system 104 generates a series of synthetic image frames of pixel information that present an undistorted image of one or more virtual objects to the user. Further details describing display subsystems are provided in U.S. Non-Provisional patent application Ser. No. 14/212,961, entitled "Display System and Method," and U.S. Pat. No. 9,671,566, entitled "Planar Waveguide Apparatus With Diffraction Element(s) and Subsystem Employing Same," which are expressly incorporated herein by reference.

In some embodiments, the projection subsystem 110 may take the form of liquid crystal on silicon (LCoS or LCOS). An LCOS may be a miniaturized reflective active-matrix liquid-crystal display or "micro display" using a liquid crystal layer on top of a silicon backplane. An LCOS may also be referred to as a spatial light modulator. LCOS may be used for wavelength selective switching, structured illumination, near-eye displays and/or optical pulse shaping. More information regarding an LCOS are disclosed in U.S. patent application Ser. No. 15/807,486 entitled "Augmented and virtual reality eyewear, systems, and methods for delivering polarized light and determining glucose levels" which have been previously incorporated by reference.

The AR system 100 further includes one or more sensors mounted to the frame structure 102 for detecting a position and movement of a head of the user 50 and/or eye position and/or inter-ocular distance of the user 50. Such sensor(s) may include image capture devices, microphones, inertial measurement units (IMUs), accelerometers, compasses, GPS units, radio devices, and/or gyros. For example, in one embodiment, the AR system 100 includes a head worn transducer subsystem that includes one or more inertial transducers to capture inertial measures indicative of movement of the head of the user 50. Such devices may be used to sense, measure, or collect information about the head movements of the user 50. For instance, these devices may be used to detect measurement movements, speeds, acceleration, and/or positions of the head of the user 50. Once the location and/or position of the user's head is known, the mixed reality engine 166 may be able to determine the distance between a user and real and/or virtual objects in the user's environment. The distance may be determined using a variety of different methods. In some embodiments, one or more depth sensors, or other environment sensing sensors (e.g. outward facing camera) may be used to create a digital replica of the real world, which, in some embodiments, may be called a world mesh. A wide variety of data may be associated with the world mesh, thus, in effect, creating an environmentally aware system, which may be called the passable world. For example, the data associated with the world mesh may be object or surface names or types (e.g. horizontal surface, table, chair, tv screen, etc.). The user's position may be compared to the passable world thus enabling distances between real and virtual objects to be calculated. In some embodiments, the passable world may correspond to all or part of a 3D render world. Further details describing methods and systems for creating a 3D mesh of a real world environment (e.g. world mesh) are provided in U.S. Non-Provisional patent application Ser. No. 15/274,823, entitled "Methods and Systems for Detecting and Combining Structural Features in 3D Reconstruction," which is expressly incorporated herein by reference in its entirety. In some embodiments, the user simply needs a digital model of the real world, or at least a sub-set of the real world comprising the user's environment. The digital model of the real world may be created using a depth sensor, passable world system (e.g. as described above), and/or a saved map.

The AR system 100 may further include a user orientation detection module. The user orientation detection module detects the instantaneous position of the head of the user 50 and may predict the position of the head of the user 50 based on position data received from the sensor(s). The user orientation detection module also tracks the eyes of the user 50, and, in particular, the direction and/or distance at which the user 50 is focused based on the tracking data received from the sensor(s).

The AR system 100 also includes a mixed reality media player 164. The mixed reality media player 164 may select and retrieve data having a mixed reality video format 162 from a 3D video database 160. The mixed reality media player 164 may interpret the mixed reality video format 162 and provide the interpretation to a mixed reality engine 166 to provide the final composition of the video based at least in part on the user's head pose to be displayed to the user 50. The mixed reality engine 166 may render the video and models that may be used for the final composition of the scene based on the user's head-pose. A more detailed disclosure of the mixed reality video format 162 and the mixed reality media player 164 will be discussed below.

The AR system 100 further includes a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs). The control subsystem may include a digital signal processor (DSP), a central processing unit (CPU), a graphics processing unit (GPU) 152, and one or more frame buffers 154. The CPU controls overall operation of the system, while the GPU 152 renders frames (i.e., translating a three-dimensional scene into a two-dimensional image) and stores these frames in the frame buffer(s) 154. While not illustrated, one or more additional integrated circuits may control the reading into and/or reading out of frames from the frame buffer(s) 154 and operation of the scanning device of the display system 104. Reading into and/or out of the frame buffer(s) 154 may employ dynamic addressing, for instance, where frames are over-rendered. The AR system 100 further includes a read only memory (ROM) and a random-access memory (RAM). The AR system 100 further includes the 3D database 160 from which the GPU 152 can access image data of one or more scenes for rendering frames, as well as synthetic sound data associated with virtual sound sources contained within the 3D scenes.

The various processing components of the AR system 100 may be physically contained in a distributed subsystem. For example, the AR system 100 may include a local processing and data module operatively coupled, such as by a wired lead or wireless connectivity, to a portion of the display system 104. The local processing and data module may be mounted in a variety of configurations, such as fixedly attached to the frame structure 102, fixedly attached to a helmet or hat, embedded in headphones, removably attached to a torso of the user 50, or removably attached to a hip of the user 50 in a belt-coupling style configuration.

The AR system 100 may further include a remote processing module and remote data repository operatively coupled, such as by a wired lead or wireless connectivity to the local processing and data module, such that these remote modules are operatively coupled to each other and available as resources to the local processing and data module. The local processing and data module may include a power-efficient processor or controller, as well as digital memory, such as flash memory, both of which may be utilized to assist in the processing, caching, and storage of data captured from the sensors and/or acquired and/or processed using the remote processing module and/or remote data repository, possibly for passage to the display system 104 after such processing or retrieval.

The remote processing module may include one or more relatively powerful processors or controllers configured to analyze and process data and/or image information. The remote data repository may include a relatively large-scale digital data storage facility, which may be available through the internet or other networking configuration in a "cloud" resource configuration.

In one embodiment, all data is stored and all computations are performed in the local processing and data module, allowing fully autonomous use from any remote modules. The couplings between the various components described above may include one or more wired interfaces or ports for providing wires or optical communications, or one or more wireless interfaces or ports, such as via radio frequency (RF), microwave, and infrared (IR) for providing wireless communications. In some implementations, all communications may be wired, while in other implementations all communications may be wireless, with the exception of the optical fiber(s).

A user 50, using, for example, a display system 104 of the AR system 100, may be looking towards the user's physical environment/landscape 105. The user's physical environment/landscape 105 may include a virtual television 120 displayed on a vertical wall 125. The vertical wall 125 may be any vertical wall in a room that the user 50 may be located in. The vertical wall may also be a wall on a side (inside or outside) of a building or any natural vertical wall seen in any location. In some embodiments, the virtual television 120 may be anchored and/or fixed to either a blank vertical wall 125 or displayed over a picture frame (not shown) hanging on a vertical wall in the user's physical environment/landscape. The virtual television 120 may be a virtual object generated by the AR system 100 that is anchored or fixed on the vertical wall 125, or in some embodiments, floating in space. The virtual television 120 may be a virtual object from which the AR system 100 may display a 3D video 115 onto or into. The virtual television 120 may be a portal within the user's physical environment/landscape 105. The portal is discussed below.

The 3D video 115 may include 3D animation objects that may be rendered and displayed along with the 3D video to provide the user 50 using the display system 104 with a realistic view of a 3D effect. The 3D animation object may actually appear as though it is spilling out/coming out of the virtual television screen. If the user moves to a viewing perspective of a side view, the user may actually see a 3D object and/or 3D animated object come out from the virtual television display screen and into the user's physical environment/landscape 105.

Additionally, in another embodiment, a 3D video may be aware of a user's physical environment/landscape 105 based on environmental sensing sensors configured on the AR system 100. Because the 3D video may be aware of the user's physical environment, the 3D video may take advantage of its environment awareness information while presenting its 3D video by rendering portions of the 3D video onto real objects within the user's physical environment. For example, the sensors within the AR system 100 may detect two chairs 135*a* and 135*b* that are situated within the user's physical environment/landscape. A 3D video about a news broadcast may place reporters 130 sitting on chairs 135*a* and 135*b* in the user's physical environment/landscape, the reporters 130 reporting the news as though the reporters 130 are in the user's physical environment. A more detailed discussion of the environment awareness aspects of this disclosure is below.

In another embodiment, a 3D video may be interactive with a user of a VR and/or AR system. As an example, at certain portions or points in time of a 3D video, the user may be offered a decision to make, which may affect the storyline of the video. Based on a user's interaction to choose a decision, the 3D video may be altered and a different ending or outcome of the 3D video may be reached. A more detailed discussion of the interactive 3D video may be found below.

Displaying 3D Videos Within a Portal of an AR Scene

A portal may be an opening and/or location within a planar surface of a 2D and/or 3D volume space where an object or other virtual content may be rendered and/or displayed inside, behind, in front of, and/or at the opening of the planar surface. The object may be seen or viewed through the opening of the planar surface and/or the location within the 3D volume space by a user 50 using a display system 104. The planar surface may be opaque such that a user may not be able to view through the planar surface. However, a user 50 may view through the opaque planar surface via the opening of the planar surface (e.g., the portal). For example, if a user is to view an object from a first perspective having a direct frontal view position, the object may appear to be a flat 2D frontal view of the object with the portal framing a border around the object. The portal may appear to be any shape such as a circle, a rectangle, a square, a polygon, etc. from this first perspective.

Continuing with the example, if the user is to view the object from a second perspective having a side view position, portions of the object may be visible to the user and other portions of the object may be blocked or not visible, depending on the side view angle of the second perspective and based on a position of the object being rendered and/or displayed relative to a frontal surface of the planar surface, such that a larger portion of the object may be viewed if the object is positioned towards the front of the planar surface as opposed to a smaller portion of the object may be viewed if the object is positioned towards the back or behind the planar surface. Portions of the object may be clipped by the planar surface if the object is positioned towards the back or behind the planar surface. The object viewed may be a 2D image, 2D video, a 3D model (e.g., a computer-generated 3D icon), and/or a 3D video. In some embodiments, the planar surface may be completely opaque such that a user may not be able to see anything located on an opposite side of the planar surface. In other embodiments, the planar surface may be semi-transparent such that a user may be able to see some objects or images through the planar surface, but not a clear view through the planar surface, as viewing through the portal.

In some embodiments, a portal effect may be created by placing a 3D virtual content directly into the final render world in a similar fashion as any other 3D virtual content to be displayed to the user. For example, the 3D virtual content would share a coordinate system with any other 3D virtual content in the final render world being displayed to the user. The coordinate system may correspond to the real-world coordinate system, so the 3D virtual content is fixed relative to the real world. In order to create a portal opening effect, a mask may be used, such as an occlusion mask. In some embodiments, the occlusion mask may be placed relative to the real-world mesh to give the appearance of a virtual opening in a real-world wall. In this example, if the user were to walk around the wall, the user may enter the portal space so the 3D virtual content previously viewed through the portal is now in the user's immediate environment, or alternatively, the user can be thought of as being within the portal world. In some embodiments, the portal may have corresponding bounds so that if the user moves beyond a certain area, the portal "closes" (e.g., the 3D content associated with the portal is removed from the final render world), thus preventing the user from actually entering the portal or directly interacting with the portal 3D virtual content.

Figure 2:
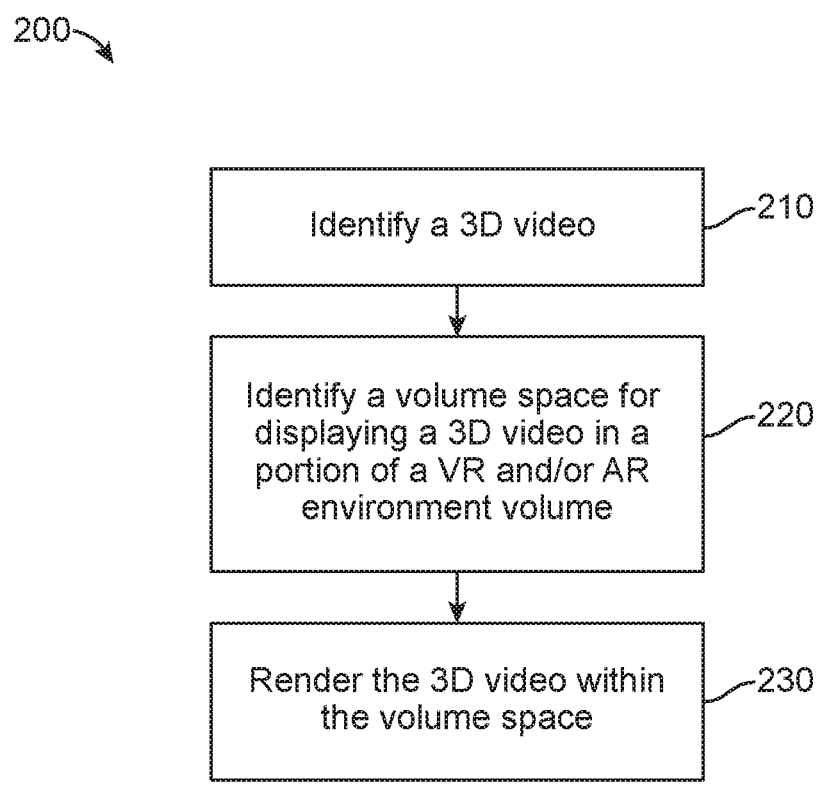
FIG. 2 shows a flowchart for an approach for displaying 3D videos in an augmented reality system, according to some embodiments.

FIG. 2 shows a flowchart for an approach for displaying 3D videos in an augmented reality system. At 210, a 3D video may be identified for being displayed within a user's physical environment/landscape. The 3D video may be a stereoscopic 3D video.

At 220, a volume space for displaying the 3D video in the user's physical environment/landscape may be identified. The volume space may be a portal for displaying the 3D object (e.g., a 3D video). The portal may be a virtual television having a planar viewing display (e.g., a virtual display screen).

At 230, a 3D video may be rendered into the volume space (e.g., a virtual television 120). The virtual television may include a planar surface having a portal that the 3D video may be rendered and ultimately displayed within. For example, a virtual television may include a border separating the portal (e.g., a virtual television screen) and a television frame itself. In some embodiments, the border may be non-existent, in such embodiments, the planar surface of the virtual television may be the entire virtual television. The 3D video may be rendered and displayed in only a portion of the user's physical environment/landscape because the 3D video may only be rendered and/or displayed within the fixed boundaries of the volume space (e.g., virtual television 120).

The 3D video may be a traditionally generated 3D video using stereoscopic images. Stereoscopic is a process by which two photographs of the same object taken at slightly different angles are viewed together, creating an impression of depth and solidity (e.g., 3D effect). Here, as an example, the 3D video is rendered and/or displayed to the user within a virtual television (e.g., a portal) within the user's physical environment/landscape. The rendering of the 3D video may include a first depth information obtained from the 3D video and a second depth information corresponding to a depth information from the location of the virtual television screen to the location of the user such that the final rendered 3D video displayed to the user 50 may include depth information that may help alleviate the problem of accommodation-vergence for the user when viewing the 3D video using the display system 104. By gathering depth info from the stereoscopic images and adding it to the screen's depth buffer, the quality of the depth info generated will be greatly enhanced, based at least in part on the scene and the algorithms that may determine depth at runtime.

In some embodiments, a 3D object (e.g., a stereoscopic 3D object or a stereoscopic 3D video) may be rendered and/or displayed through a portal. Traditionally, 2D images are rendered and displayed via a portal. However, in an augmented reality environment, 3D objects and 3D videos may be rendered and displayed through a portal (e.g., a virtual television) within the AR environment.

In one embodiment, a portal may be identified in a 3D render world (or alternatively 3D render scene, render scene, or 3D scene). The 3D render world may be a digital representation of 2D and 3D digital content placed relative to a digital representation of the real world (e.g. user's physical environment/landscape 105), where the 2D and 3D digital content could be rendered as virtual content and displayed to the user. In order for the virtual content to be rendered from the correct perspective relative to the user and the real world, two or more virtual render cameras may be placed in the 3D render world. One virtual render camera could be for the right eye, and the other virtual render camera could be for the left eye. A portal may be located within the 3D render world, which could require additional virtual render cameras to be placed in a different location of the 3D render scene in order to capture what a user would see from the portal perspective. The portal may be a portion within the planar surface that allows a user to see through the planar surface, or into the planar surface. The portal may be a virtual television screen, wherein the virtual television may provide the planar surface within the 3D render world, and the virtual television screen may be the opening in the planar surface of the virtual television.

Additionally, a first 2D stereoscopic image and a second 2D stereoscopic image may be rendered into the portal such that a user using a display system 104 may perceive the first 2D stereoscopic image and the second 2D stereoscopic image together as a 3D image or a 3D model. The first 2D stereoscopic image may be an image captured with a perspective of a right eye and the second 2D stereoscopic image may be an image captured with a perspective of a left eye. The 3D image may be a 3D video, wherein the first 2D stereoscopic image may be a first 2D stereoscopic video captured from a perspective of a right eye and the second 2D stereoscopic image may be a second 2D stereoscopic video captured from a perspective of a left eye. As discussed above, the 3D video may be a traditionally generated 3D video (e.g., for use on a real screen in the real world) using stereoscopic images. Here, the 3D video may be rendered and displayed within the portal of a 3D render world.

Furthermore, the first 2D stereoscopic image and the second 2D stereoscopic image may be sourced from two different virtual cameras located within different locations of the 3D render world. In some embodiments, the first 2D stereoscopic image and the second 2D stereoscopic image may be sourced from two different real-world cameras capturing real world content. For example, the user 50 may be watching on a virtual television screen, using a display system 104 within the user's physical environment/landscape 105, a 3D video that is receiving video data from two cameras capturing real world images (e.g., security cameras of the user's actual house) that may be rendered as the 3D video. Additionally, the first and second 2D stereoscopic images may also be sourced from a different 3D render world, such as a portal icon.

In one embodiment, an icon may be displayed within a portal. The icon may be a 3D object that is computer-generated. The icon may be composed of several parts. In some embodiments, the portal icon may have a background that is contained within the portal, an aperture, and a foreground element that is able to move in and out of the aperture- up to and including complete removal of the foreground element from the icon and aperture. The icon may represent an application that a user may launch from an application launcher menu. The application launcher menu may comprise one or more 3D icons presented each within their respective portals. This may allow 3D content associated with the application to be easily contained within the icon but still viewed by the user. When a user is looking at the icon situated inside the portal, the icon may activate and start animating. When the user is not looking at the icon, the icon may appear to be a flat 2D image displayed within the portal. However, as the user's eye gaze begins to focus onto the icon (e.g. flat 2D icon) displayed in an idle state within the portal, the icon may begin to transform (e.g. into a 3D icon) within the portal. The (e.g. 3D) icon may even begin to move towards the user and leave the portal and appear to float outside of the portal so that the user may view the icon as a 3D icon object. The user may view the 3D icon from multiple angles. This may be advantageous because a common problem with icons are that they are relatively small in size and are typically 2D images with limited space to describe the application that they represent. However, this problem may be solved by displaying a 3D icon wherein the 3D icon may have a larger surface, simply because of the additional surface area available to a 3D icon vs a 2D icon. In some embodiments, the 3D icon may display a smaller version of the actual application that may be launched from the icon, so that the user may be able to see and recognize the icon.

In another embodiment, two first stage cameras may be placed in a 3D environment. One or more pairs of 2D images may be captured from the two first stage cameras. The one or more pairs of 2D images may be placed into a location within a final 3D render world. The final 3D render world may be rendered to be displayed to a user using a virtual and/or augmented reality device (e.g., display system 104) wherein the display system 104 may include two virtual cameras capturing 2D images of the world scene, where each camera of the two cameras correspond to an eye of the user. In other words, the two first stage cameras provide the content for a 3D stereoscopic video. The 3D stereoscopic video is placed into a location within a final 3D render scene. The final 3D render world/scene may be captured from a separate pair of two virtual cameras from a perspective of the user using a display system 104 such that each camera of the pair of two cameras corresponds to an eye of the user using the display system 104 so that the final 3D stereoscopic video displayed to the user via the display system 104 is a final 3D video having at least one other 3D video displayed within the final 3D video at a portal within the final 3D video. As discussed above, depth information may be included during the rendering of the final 3D video to accommodate vergence experienced by a user's own vision system (e.g., the user's eyes).

In one or more embodiments, the render location may be a portal such as a virtual television, or a planar surface of a user's environment for displaying a 3D video. A first camera of the two first stage cameras may capture one or more 2D images from a left eye perspective and a second camera of the two first stage camera may capture one or more 2D images from a right eye perspective. The two first stage cameras may be virtual cameras (e.g., capturing images of a digital/virtual world scene) and/or real-world cameras (e.g., capturing images of a real-world scene).

In some embodiments two second stage cameras may capture 2D images to generate a second 3D stereoscopic video. The second 3D stereoscopic video may be placed in another location/portal within a final 3D render world to be rendered, so that when the final 3D render scene is displayed to the user, the user may see two 3D stereoscopic videos within the user's virtual and/or augmented reality environment, each of the two 3D stereoscopic videos may be displayed at two different portals. There may be multiple stages of cameras providing 3D stereoscopic video sources to a final 3D render world, where each of the 3D stereoscopic video sources may corresponds to additional stages, but there may be only one final 3D render world that is rendered to be displayed to the user using the display system 104. The number of stages may correspond to the number of input source(s) of 3D videos to be rendered in the final 3D render world and the number of stages may determine the number of 3D videos displayed to the user from multiple locations (e.g., portals) within the 3D environment of the user. Alternatively, any number of inputs may input to the final 3D render world for a two stage render with more than two sets of inputs. In some embodiments, the 3D videos may be nested, so, for example, one 3D video plays inside of a different 3D video which may then be included in a final render scene for display to a user.

In one or more embodiments, the 2D images captured from one or more stages of cameras (not including the final stage cameras) may be from a virtual world, a real world, or a combination of both virtual world and real world. The locations of the one or more stages of cameras may be different than the location of the final stage cameras.

In another embodiment, a first 3D content from a first source may be placed into a second 3D content from a second source. The first 3D content may be a 3D stereoscopic video and the 3D stereoscopic video may be an input data source to a second 3D video that includes the first 3D stereoscopic video. The second 3D content may be a 3D stereoscopic video wherein the source of the video input to render and display the second 3D content may include the first 3D content.

In another embodiment, a first set of stereoscopic images may be placed inside a second set of stereoscopic images to provide a final 3D video showing the first set of stereoscopic images as a 3D video.

In another embodiment, a pair of input images corresponding to images captured for a left eye and images captured for a right eye is identified. The pair of input images may be specified to be rendered into a specified location within a scene to be rendered, wherein once the scene is rendered, the pair of input images may be displayed as a 3D video within the scene.

In another embodiment, a 3D data input may be identified so that the 3D data input may be placed into a location within a virtual and/or augmented reality final 3D render world. The final 3D render world may correspond to a scene as viewed by a user using a virtual and/or augmented reality device.

In an alternate embodiment, a portal-like effect may be created through the use of one or more stencil render stages. In some embodiments, instead of having 2 input streams, one for each eye, and instead of two first stage cameras, as described above, the data input may be a 3D graphic data file. The data file may contain one or more data files associated with a single application or single content, and may contain various flags, such as a stencil flag. When the final 3D render world is rendering, the content for a portal in the final 3D render world may render in 4 steps: 1) draw stencil, 2) draw skybox for stencil, 3) draw portal content, and 4) clear stencil. These 4 steps may repeat for each of the portals in the final 3D render world.

3D Video Extends Beyond its Display Surface

Referring to FIG. 1, a user 50 viewing the 3D video 115 using the display system 104 may notice that objects (e.g., a block as depicted in video 115) within the 3D video 115 may appear to spill over or extend beyond a surface of a display screen within the user's physical environment/landscape 105. For example, traditional 3D videos may provide an illusion or an appearance of a 3D effect and in some cases, may influence/trick a user to believing an object from within the 3D video is actually moving towards the user and actually coming out of the screen. However, traditional 3D videos, as discussed above, achieve the 3D effects using the stereoscopic process.

A traditional 3D video placed into a VR/AR environment may only be viewed from one perspective. The traditional 3D video looks obviously flat as soon as the viewer departs from the camera's original position. One solution to this problem may include a video file format and player that includes mesh (e.g., 3D models and/or 3D animations), rig controls (e.g., animation stream), and its corresponding control data (e.g., when to play what portions of the animation stream within the video file format to correspond with the video and audio of a traditional 3D video).

Figure 3A:
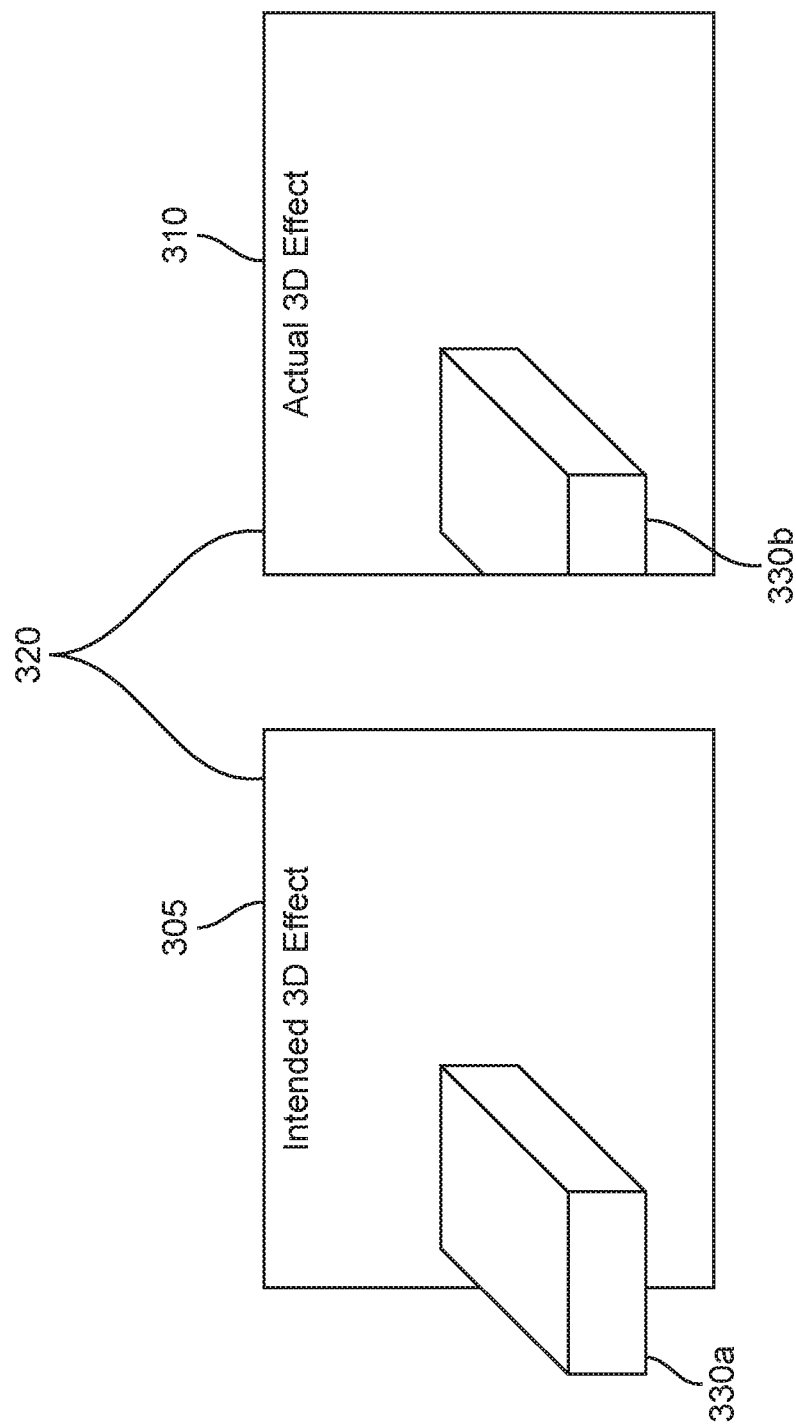
FIGS. 3A-3B show examples of 3D images and/or 3D animations that escape a screen, according to some embodiments.
Figure 3B:
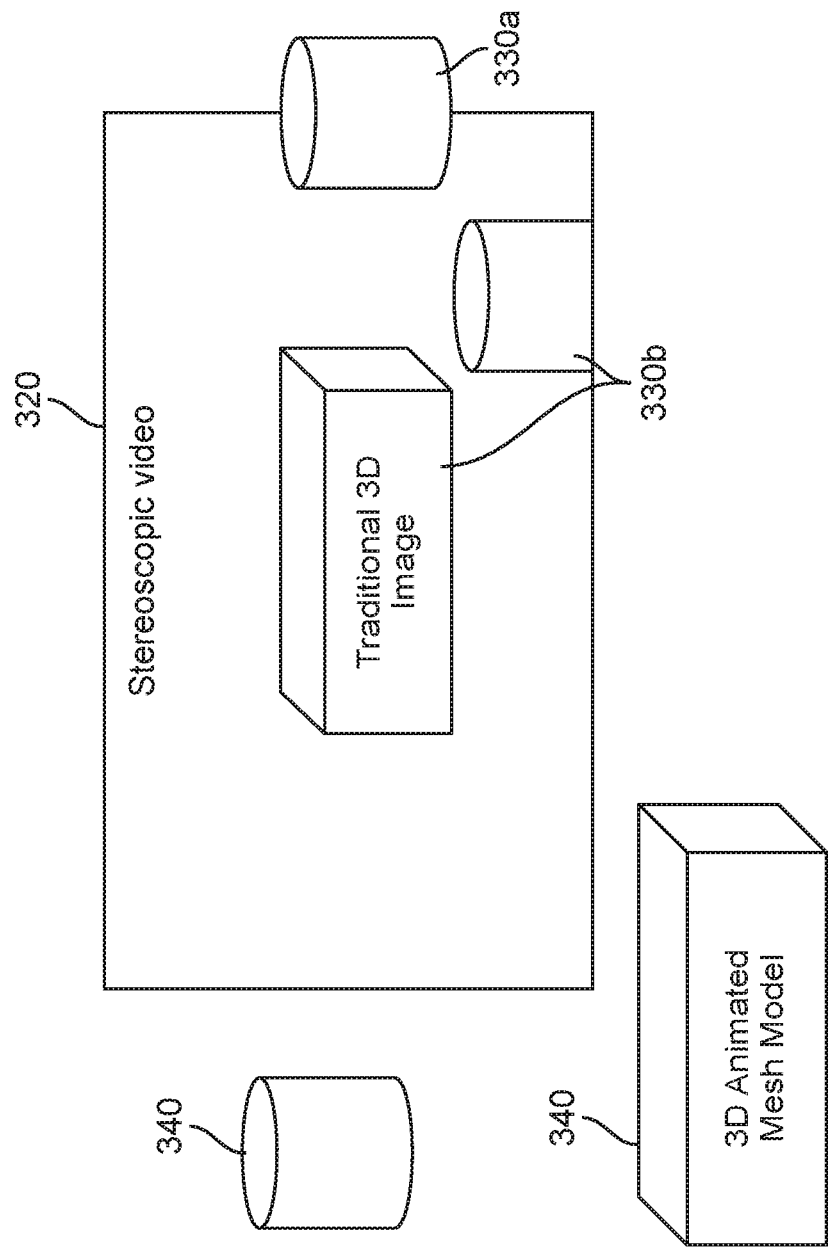

FIGS. 3A-3B show examples of 3D images and/or 3D animation that escapes a screen, according to some embodiments. FIG. 3A shows an intended 3D effect 305 and an actual 3D effect 310 of a traditional stereoscopic 3D video. Display screen/planar surface 320 may be one or more of a display screen of a television, a computer monitor, a theater, or any planar or non-planar surface for displaying a 3D video upon, or any combination thereof. For example, a non-planar surface may be a curved display screen that, in some embodiments, may appear to at least partially wrap around the viewer. 3D objects 330 are shown based on the intended 3D effect and an actual 3D effect. Current 3D technologies employing, for example stereoscopic images, may want to produce the intended 3D effects of object 330*a*. However, given the limitation of the legacy stereoscopic 3D processes, the actual 3D effect that the current legacy systems produce is shown as the 3D object 330*b*. The intended effects of object 330*a* may show a 3D animated object displayed outside of the planar surface 320 which may animate/move around a user's environment such that if the user moved to a second position having a different viewing angle of the planar surface 320, the user may see the full (or relevant portion) 3D representation of object 330*a* displayed and located outside of the planar surface 320.

FIG. 3B shows an example of how a user may perceive an intended 3D effect. Objects 330*a* and 330*b* are objects as viewed in FIG. 3A, wherein object 330*a* may appear to have spilled out/came out of the planar surface 320 (e.g., a television screen display). Objects 340 may be viewed as objects completely detached from the planar surface 320 such that the objects 340 achieve one of the intended 3D effects 305 from FIG. 3A.

For example, a 3D video may include a 3D video of a person scuba diving in a tropical body of water having a plurality of fish swimming around the person. From a traditional 3D video perspective, a user may watch the 3D video and feel the 3D effect based at least in part on the stereoscopic process. However, according to some embodiments of the disclosure, at certain portions of the 3D video, a 3D model of one of the fish may be generated for display relative to the 3D video. At certain appropriate trigger time(s) within the 3D video, the 3D model of the fish may be displayed to be swimming inside the 3D video and then the 3D model of the fish may begin to leave the surface of the display screen and swim into the user's physical environment/landscape. As an example, the 3D animation of the fish may swim around the actual virtual television that is displaying the 3D video. In this example, if the user moves to a different position such as a 90-degree angle parallel to the surface of the display screen, the user should still see the 3D animated fish swimming around the virtual television. If the user returns to a viewing angle where the user may see both the 3D animated fish swimming outside of the display screen of the virtual television and the display screen, the user may view the 3D video playing along with the 3D model moving outside of the display screen. In some embodiments, the user may view a 3D video from more than one display. For example, the fish may swim out of display 1, swim around the user, and swim into display 2. In some embodiments, the user may have one large screen enclosing the user (e.g. dome shape, partial dome shape, ring shape, etc.), and 3D content may exit the screen at a first location, and re-enter the screen at a second location. Regardless of the exit or enter location of the 3D content, the user may view the 3D object from a correct perspective in a realistic manner (analogous to a real 3D object).

Referring to FIG. 1, 3D video 115 may include a 3D animation of a person or object appearing to be spilling out/coming out of a display screen of virtual television 120. The virtual television 120 and the 3D video 115, when viewed from a second angle within the user's physical environment/landscape 105 may show an object (e.g., a monster) spilling out/coming out of the display screen of the virtual television.

Figure 4:
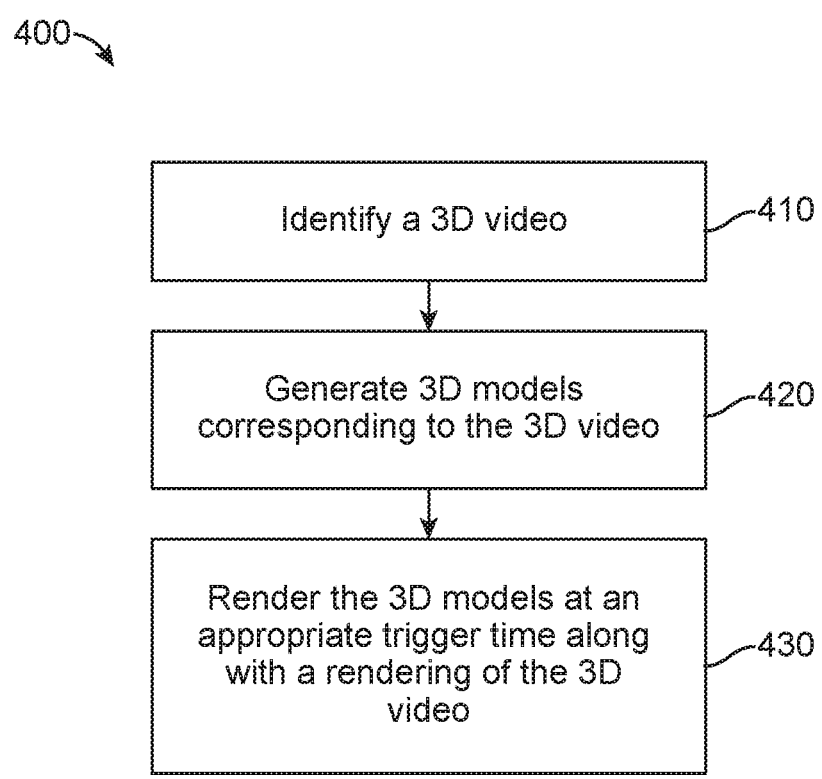
FIG. 4 shows a flowchart for an approach for displaying 3D video that extends beyond a surface of a display screen in a virtual and/or augmented reality environment, according to some embodiments.

FIG. 4 shows a flowchart for an approach for displaying 3D video that extends beyond a surface of a display screen in a virtual and/or augmented reality environment, according to some embodiments. At 410, a 3D video may be identified. The 3D video may be a traditional stereoscopic 3D video. Legacy implementations of 3D videos may provide a large amount of 3D video content to be sourced as 3D video input data sources to be used to implement embodiments of this disclosure.

At 420, 3D models of 3D objects may be generated to correspond to the 3D videos. The 3D objects may be stationary 3D objects or animated 3D objects that include movements of the 3D object from a fixed location or movements of the entire 3D object within a 3D environment. The 3D models may correspond to the 3D video such that if the 3D video scene is a certain blue color and the 3D model of the 3D object is of the same or substantially similar blue color, then the 3D model may not be visible to a user. Therefore, the 3D model may be slightly adjusted in color, texture, contrast, or other characteristic in order for the user to detect the 3D model as it is being displayed with the 3D video. The 3D models of the 3D objects may be generated and saved within a data store. Animation data may be associated with the 3D model to control and direct movement, orientation and/or position of the 3D model relative to the 3D video. The animation data may be streamed as a separate and different stream from the traditional 3D video stream and audio stream within a media file. The animation data will be disclosed in more detail below.

At 430, the 3D models may be rendered at an appropriate trigger time along with the rendering of the 3D video. The 3D animation data may be received and rendered by an engine that renders the 3D animation data along with the 3D video and audio portions of the 3D video. The 3D animation and the 3D video may appear to a user as a single 3D video wherein 3D animated objects may appear to exit the planar surface of a 3D video and spill out/come out into the user's 3D environment.

In one or more embodiments, the one or more 3D models may be rendered onto one or more video panes, and the one or more video panes may be rendered at a same time for one or more viewing orientations. The one or more 3D models may physically appear as spilling out/coming out of the display screen of the virtual television. In some embodiments, the video panes may function as a background and/or a backdrop to display the 3D models corresponding to a viewing angle from the user 50 using the display system 104.

A depth information may be factored into the rendering of the 3D video and the one or more 3D models to solve the problem of accommodation-vergence mismatch which may be generally associated with legacy VR systems. The distance from the user using the display system 104 and the 3D model may be factored into how the image or video of the 3D video and the 3D model may be displayed to the user. For example, multiple depth information may be determined for the 3D video being displayed to the user. A first depth information may include a depth information of the original 3D video such as a determined distance of the cameras capturing the 3D videos to objects within the 3D videos. A second depth information may include a distance from the user watching the 3D video to the portal/location of the 3D video placed within the user's 3D environment. A third depth information may include a distance from the 3D models/3D animated objects to the user viewing the 3D video wherein 3D animated objects are spilling out/coming out of the video (e.g. exiting a planar surface of the video display screen). In some embodiments, the 3D animated objects may be moving towards the user, thereby decreasing the distance between the user and the 3D animated objects. If the depth information is not included in the calculation which results in the display of the final scene, including the 3D video and the 3D animated object, to a user, the user's brain may be confused as to how to orient the user's eyes to address the accommodation-vergence issue common in most 3D video system. In some embodiments, a distance from a user of a virtual and/or augmented reality device to the 3D video and respective one or more 3D models displayed within the virtual and/or augmented reality environment may be calculated in any suitable manner. In some embodiments where more than one 3D model is displayed, the location of the 3D models used in the distance calculation may be the closest most point to the user of any of the 3D models being displayed. In some embodiments, the location of the 3D models used in the distance calculation may be the average of the origin of the 3D models displayed to the user.

In one or more embodiments, the 3D video may include a video format that may include a control data. The control data may instruct a video player to display the 3D models outside of the display screen such that the 3D models appear to a user to be spilling out of the display screen. The control data may help to coordinate and integrate the 3D models and the 3D video to appear to a user as though the 3D models and the 3D video are integrated as a single 3D video.

In some embodiments, the one or more 3D models may be rendered based at least in part on a Voxel based video stream. A voxel represents a value on a regular grid in three-dimensional space. As with pixels in a bitmap, voxels themselves do not typically have their position (their coordinates) explicitly encoded along with their values. Instead, rendering systems infer the position of a voxel based upon its position relative to other voxels (e.g., its position in the data structure that makes up a single volumetric image). In contrast to pixels and voxels, points and polygons are often explicitly represented by the coordinates of their vertices. A direct consequence of this difference is that polygons can efficiently represent simple 3D structures with lots of empty or homogeneously filled space, while voxels excel at representing regularly sampled spaces that are non-homogeneously filled. Voxel based videos may require very high bandwidth/performance, which may translate to higher production computing costs and possibly a larger amount of data storage to implement the volumetric video.

In another embodiment, the one or more 3D models and/or the 3D video may be based at least in part on a volumetric video. Volumetric video is a format of video featuring moving images of real people that exist truly in 3D—like holograms—allowing them to be viewed from any angle at any moment in time. The trick is that this media requires a fundamentally different video technology capable of capturing 3D images of actors at fast frame rates. Volumetric videos may require very high bandwidth/performance, which may translate to higher production costs, not in a monetary perspective, but from the perspective of the computer processing process itself by requiring a larger computing processing power and possibly a larger amount of data storage to implement the volumetric video.

Environmentally Aware Videos

Traditional videos have always presented its content without being aware of the watcher's environment. Immersive experiences can greatly be enhanced if the video content can be customized to the user's environment. In a virtual and/or augmented reality system, a user using a virtual and/or augmented reality system device (e.g., display system 104 from FIG. 1), may provide additional user environment information to a video so that the video may take advantage of the additional user environment information when displaying the video's content.

For example, object recognizers (e.g., sensors) may recognize and categorize items, for example chair 1, table 2 etc., within a room of a user's physical environment/landscape. Head pose and eye tracking may be used to provide hints to a mixed reality video player on where the user is looking. Having additional user environment information may allow 3D videos to break free of its limited 2D display space.

Referring to FIG. 1, the 3D video about the news broadcast may place the reporters 130 sitting on the chairs 135a and 135b in the user's physical environment/landscape (e.g., the user's living room, dining room, automobile, etc.). Instead of displaying the 3D video in a traditional video screen, the environmentally aware 3D video may instead render the reporters 130 to be displayed on or relative to an object that may be detected within the physical environment of the user. The object may be a rendered version of a physical object within the user's physical environment. The object may be a rendered version of an object within a virtual world. The object may be a rendered virtual object placed within the user's physical environment for the purpose of displaying the object outside of a traditional video screen. The 3D video may be a 3D stereoscopic video, a Voxel based video, and/or a volumetric video.

Figure 5:
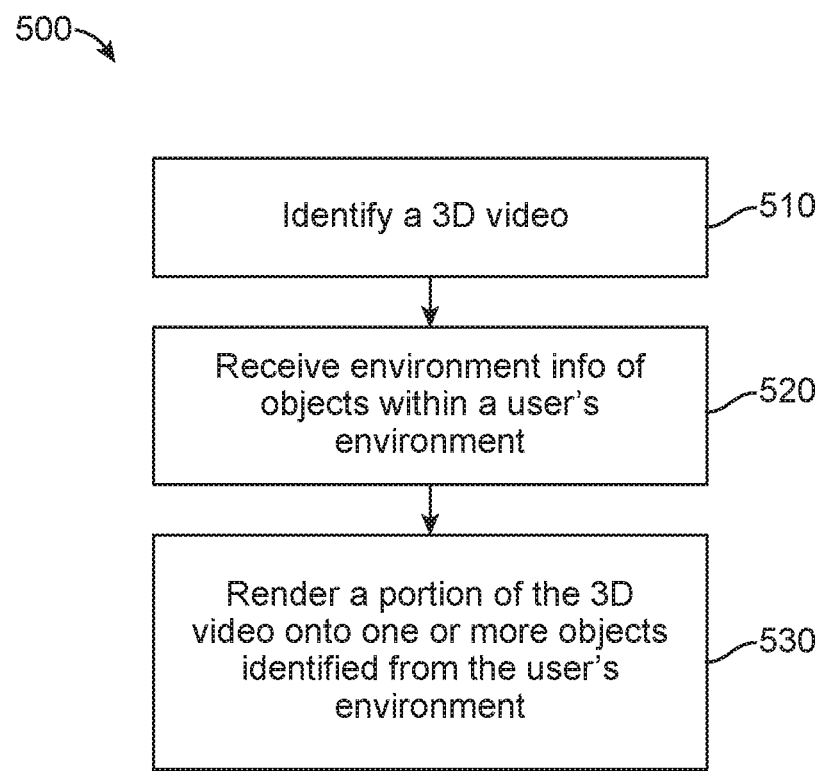
FIG. 5 shows a flowchart for an approach for displaying an environment aware 3D video in a virtual and/or augmented reality environment, according to some embodiments.

FIG. 5 shows a flowchart for an approach for displaying an environment aware 3D video in a virtual and/or augmented reality environment, according to some embodiments. At 510, a 3D video may be identified. The 3D video may be at least one of a traditional stereoscopic 3D video, a voxel video, or volumetric video.

At 520, environmental information may be received pertaining to objects detected/identified within a user's environment. The user's environment may be a physical and/or virtual environment. The user's physical environment may include the user's current physical environment as viewed from the perspective of the user via a VR and/or AR device (e.g., AR system 100). The user's virtual environment may comprise virtual content displayed to the user as viewed from the perspective of the user via a VR and/or AR display device (e.g., display system 104). The environmental information may include information pertaining to objects captured by sensors of the VR and/or AR system (e.g., cameras) and interpreted by the VR and/or AR system to identify the objects captured by the sensors. In some embodiments, the environmental information may be sourced from and/or stored in the passable world.

The environmental information (e.g., information of objects within the scene) captured by the sensors may be mapped to previously identified objects stored in an external system (e.g., cloud system) wherein detailed information of the identified objects (e.g., point clouds) may be available to further define the objects. Elements of the user's environment (e.g., physical environment and/or virtual environment) may be mapped to the previously identified objects to provide more detailed information to the environmental information.

At 530, portions and/or all of the 3D video content may be rendered onto the objects identified from the user's environment. The rendered video may be displayed to a user using a VR and/or AR display device (e.g., display system 104) wherein the user may view portions of the 3D video at a first location in the user's environment (e.g., a portal location) and the user may view portions of the 3D video at a second location in the user's environment. For example, reporters sitting on chairs at a news room within traditional videos, may be displayed to be sitting on chairs within the user's living room, the reporters providing, for example, the evening news to the user within the user's physical environment/landscape. Supplemental information may be displayed on the associated 2D virtual television screen/portal. The 3D video content may include a video file format comprising control data. The control data may instruct a video player to display a portion of the 3D video (e.g., the reporters) onto the objects identified from an environment of the user.

User Interactive Movie

A problem with traditional movies (e.g., a movie is a type of video) is that the traditional movies have already been edited by a director/producer of the movies. Users or viewers of the movies generally do not have control over what is being displayed or what decisions a character within the movies may be making. This is because the storyline of the movie is already set by the author/director/producer of the movies. However, in a VR and/or AR environment, videos may be interactive. Users may be able to affect a story line and/or outcome of the video based at least in part on user decisions provided through the VR and/or AR system while the video is being displayed to the user via, for example, a display system 104.

The user decisions provided through the VR and/or AR system may be in the form of a user choosing or providing an answer to a question provided by the VR and/or AR system, for example, asking how the user would decide on certain options during the video. The actions may be ones made by an actor or actress, or could be outside of the control of the actors, such as a weather event, natural disaster, timing, etc. Based on the decisions made by the user, the storyline of the video may change such that further events of the video may be affected and various conclusions may be reached for the video.

Figure 6:
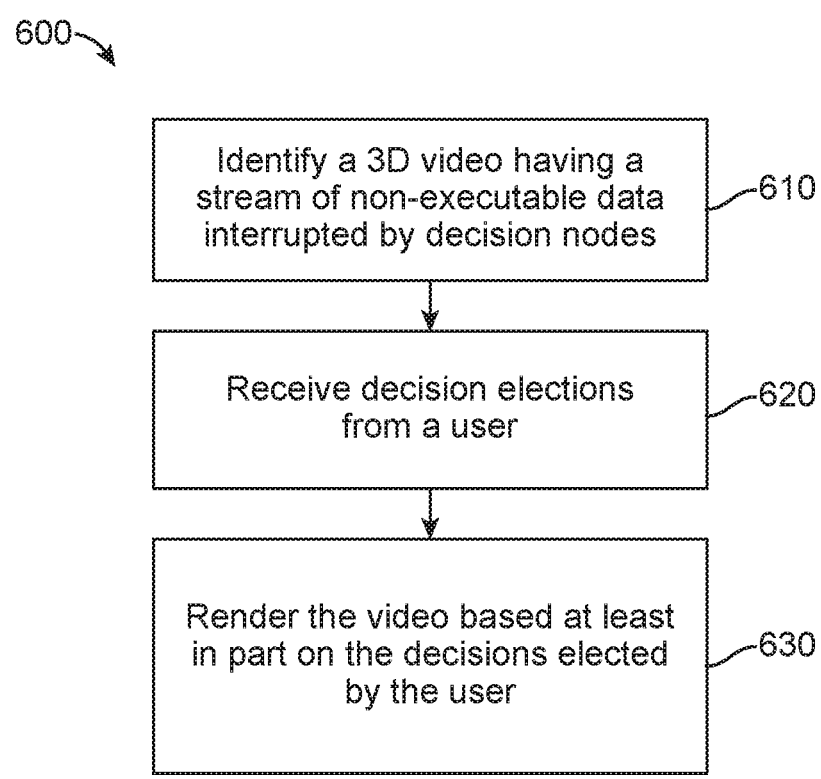
FIG. 6 shows a flowchart for displaying interactive 3D video in a virtual and/or augmented reality environment, according to some embodiments.

FIG. 6 shows a flowchart for displaying interactive 3D video in a virtual and/or augmented reality environment, according to some embodiments. At 610, a 3D video may be identified. The 3D video may be a stream of non-executable data periodically interrupted by decision nodes. Typically, videos are formatted as executable files that may be played by a video player. The non-executable data may include video data, audio data, and/or animation data. The non-executable data may be interrupted by decision nodes that may correspond to various versions of the storyline, based on decisions made at the decision nodes by, for example, an interaction from a user providing input corresponding to the respective decisions.

At 620, interactions from a user may be received as input corresponding to decisions elected by the user. Currently DVD and BluRay videos have simple navigation systems via a remote controller. In a VR and/or AR system, the remote controller may extend this behavior to incorporate various other user input sources such as, for example, head pose, eye tracking, gestures, totem gestures, and/or object recognizers. Simple interactions received from the user (e.g., a decision made for at a particular decision node) may "jump" the video to different parts of the video. Options and decisions made may be stored during the duration of the video to maintain a state of the video. Interactions may be triggered by, for example, a user clicking on options, hand gestures, eye gaze in combination with a selection from a user input device, etc.

For example, during a debate broadcast, depending on which presenter the user is looking at, that presenter's 3D animation may be played in the video, or in a chair within the user's environment. As another example, different video endings may be reached based on approval and/or participation of the viewer (e.g., the user 50 from FIG. 1). As yet another example, military generals may be discussing war strategies with a map displayed in front of the user on a horizontal table. The user may participate in the discussion of war strategies by providing input as to which strategies the generals should implement. Upon providing the decision of the strategy to implement, the video may jump/navigate to the appropriate stream of data based upon that decision, to display the video.

At 630, the 3D video may be rendered at the portion of the video corresponding to the appropriate stream of data (e.g., video, audio, and/or animation stream) to be rendered based on a decision and displayed to the user.

In one or more embodiments, the 3D video may be a stereoscopic 3D video. The 3D video may have a video format comprising control data. The control data may instruct a video player to render portions of the 3D video based at least in part on the decisions elected by the user. The portions of the 3D video may be associated with a particular storyline based on one or more decisions elected by the user. The interactions received from the user may comprise at least one of a head pose, an eye tracking, an eye gaze, hand gestures of the user, totem gestures, or an object recognizer. An interaction from one of the interactions received from the user may jump the 3D video to a different part of the 3D video.

Mixed Reality Video Format

Traditional video formats have a general high-level format meant for streaming. Some video formats may include only independent frame-based frames, where every frame of data is not related to a previous frame and is essentially independent from one another. Another form of video format may be key—delta frame base. Common streaming compression techniques involve sending in a key frame that is independent of all the frames and subsequent delta frames only comprise differences from that key frame until another key frame is encountered. Theoretically it is possible to have just a single key frame with all subsequent delta frames. However, since seeking (e.g., forwarding/rewinding) to a frame requires rebuilding from the closest key frame, it may be beneficial to have a key frame at certain intervals throughout the video with delta frames in between, as opposed to having just a single key frame and only subsequent delta frames.

Traditional videos are pre-rendered with video and audio clips along with general controls of the video such as chapter breaks, closed captions for multiple languages, sound qualities during playback, etc. Embodiments of the present disclosure may include both pre-rendered and runtime generated 3D frames, wherein the pre-rendered and the runtime generated 3D frames may be reused in several portions of the video. Runtime generated 3D frames may incorporate several assets within a video format. For example, some assets may include 3D models, mesh, animations, textures, shaders, and lights. Furthermore, a more elaborate and complex control mechanism may control an integration of the runtime generated 3D frames with the pre-rendered frames of a video. A more capable and flexible format will now be disclosed to encapsulate such assets that may also be streaming friendly.

Figure 7:
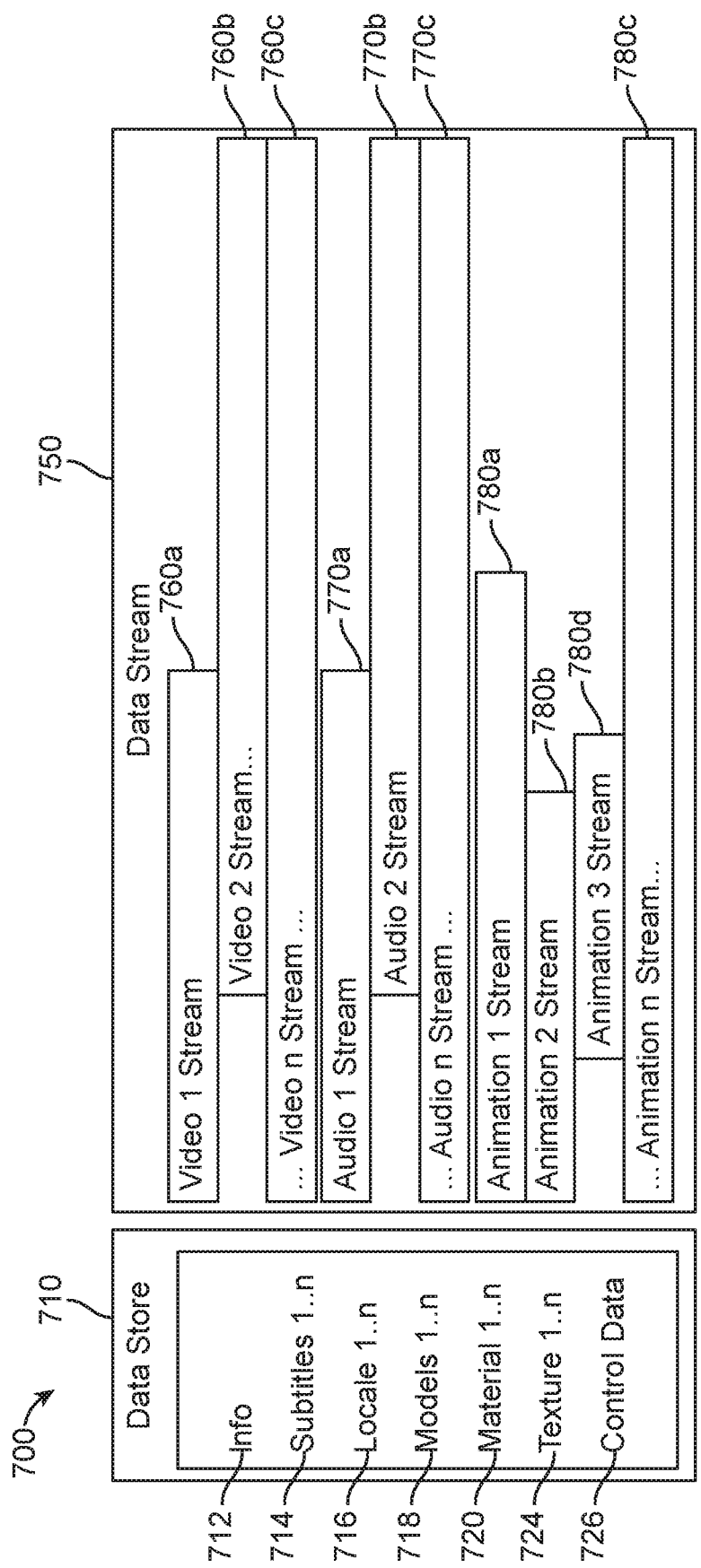
FIG. 7 shows a video format for displaying 3D videos, according to some embodiments.

FIG. 7 shows a video format for displaying 3D videos, according to some embodiments. The video format 700 may be a virtual and/or augmented/mixed reality video format. The video format 700 may include a data store 710 and a data stream 750. The data store 710 may be a collection of data that may be loaded and unloaded depending on the section of the video being played. Unlike streaming data, data from the data store 710 may be loaded into memory. In some embodiments, for example, all models 718 and their respective textures 724 may be loaded into memory and remain in memory until a section of the video no longer needs them. In some embodiments, all data from the data store 710 may be loaded into memory. Data from a particular section of the video may be reused in several sections of the video. The data store 710 may include information 712 about the video (e.g., menus), subtitles 714, locale 716, models 718 (e.g., meshes of 3D models), material 720, texture 724 (e.g., images used by the materials), and control data 726.

Control data 726 may control the flow and rendering of video/audio/animation streams via a control stream (disclosed below). The control data may look ahead into the video to determine what is to come for the video/audio/animation stream so that data intensive objects (e.g., 3D models) may be preloaded ahead of time so that when the time comes and the animation stream needs to control the 3D model, the 3D model may be ready for use. The control data may take into account a user's bandwidth and the user's processing power to determine how much of a lead time the control data may need to, for example, load the 3D model before the 3D model is needed by the animation stream. Traditionally, video and audio streams do not need to look forward or ahead very much because their data are just serially streamed and played by a video player. Here, the video, audio and animation stream may look forward and backward for as far as the next or previous key frame, respectively. However, the control data may need to look even further ahead because the control data may be responsible for controlling what happens next in the rendering and displaying of the video content. In some embodiments, the entire content of the control data for a video may be loaded upon startup of the video.

The control data 726 may determine which model 718 may be used and which animation to link/associate to the model 718 so that the model 718 (e.g., a 3D model) may move. For example, the control data 726 may select from the data store a 3D model of a fish from the models 718, associate an animation to the fish to have the 3D model of the fish swim out of the display screen into the 3D environment, swim in a circle around the display screen that is displaying the pre-rendered 3D video, and swim back into the display screen to be incorporated with a similar fish swimming within the pre-rendered 3D video displayed on the display screen within the 3D environment.

The subtitles 714 may be subtitles corresponding to an audio stream in the video. The subtitles 714 may include subtitles in several languages. The locale 716 may be a localized version of several languages for in-video audio. The locale 716 may be referenced thru a Locale_tag such that the video may be authored for several languages. Models 718 may be 3D models of objects within the video that may be rendered and displayed, at least partially, outside of the display screen. The 3D models may be meshes of the 3D object. Meshes of the 3D object may be represented as a network of lines connecting a set of vertices to form a 3D model of a 3D object. Material 720 may be various materials that may be used to cover the 3D model/mesh. Texture 724 may be various textures that may be used to render the models 718. In some embodiments, additional or different 3D model data may be included, as long as the data represents a renderable 3D model.

The data stream 750 section of the mixed reality video format may be a sliding window of data comprising key frames and delta frames of video, audio, and animation streams. The data stream 750 may include video streams 760, audio streams 770, and animation streams 780. Video streams 760 may include video data of the video. Audio streams 770 may include audio data corresponding to the video stream 760.

Animation streams 780 may include model animations, which may be applied to a compatible model 718. The animation streams 780 may control how 3D models/meshes move and behave relative to the video and audio streams. For example, a 3D model/mesh may be a 3D model of a fish. An animation stream may include instructions for how the fish moves and where the fish is displayed relative to the display screen. For example, at a certain point of time during the video, the animation stream may instruct a 3D model of a fish to be displayed as swimming out of the video screen and into the user's environment. The fish may swim around the video screen and the fish may swim back into the video screen, at which time, the animation stream for the fish may end. Each 3D model may have its own animation stream. Some 3D models may be associated/linked to more than one animation streams. The multiple animation streams depicted in FIG. 7 show that, in this embodiment, more than one animation stream exists and as such, one or more models may be associated to the plurality of animation streams. In other embodiments, a single animation stream may be used to manage the display of one or more 3D models within the video.

A control stream (not shown in FIG. 7) may be responsible for indicating the Model/Mesh/Texture etc. to load from the data store and link the model to an associated animation stream at an appropriate time within a timeline of the video. In some embodiments, the control stream may be dynamically generated from the control data and a time controller module (disclosed below) when a video player reads/receives data from the video format. The control stream may only include key frames. The control stream may include commands (which may be called control commands) and/or simple logic gates to determine a combination of one or more models and/or animations to play at the appropriate time within a timeline of the video.

In some embodiments, the control stream is data that is not streamed from the video file but is preloaded into memory from control data 726 within the data store 710. Similar to subtitles, control stream data does not need to be streamed from a file because both subtitles and control data file sizes are generally not very large and thus, both may be loaded into memory without much cost to the amount of memory used. Preloading the control stream into memory provides significant control over the buffering required for loading other data from the data store 710. For example, the control stream, being preloaded into memory, may be configured to look ahead in time (e.g., further ahead in time than the video or audio streams) into the video to determine upcoming models and animations to be displayed. If the control stream determines that an upcoming model is needed (e.g. relative to the current time according to the time controller for the video currently being displayed to the user), the appropriate model and its associated animations (if any) may be preloaded into buffered memory so that when the model(s) is executed by the control stream, the 3D model may be displayed in synchronization with the video, audio and animation streams of the video. In some embodiments, the control stream is streamed instead of preloaded into memory.

In some embodiments, the 3D model may just be displayed without any animation. The control stream may determine, based at least in part on a size of the model, a user's network bandwidth and processing power of the user's VR and/or AR system, how far ahead in time a model may need to be loaded into memory so that when the time comes to display the model and its associated animation (if any), the video playback would not be delayed due to the model not being ready or to be displayed in time. In some embodiments, the control stream may determine a model loaded into memory may not be needed for some time, and thus, may unload the model from memory until the model is needed again at a future time.

In one embodiment, a video format may include animation streams, a data store, and at least one of a video stream or audio stream. The one or more animation streams may be applied to respective compatible models. In some embodiments, the data store may be a collection of data loaded and unloaded depending on the section of the video being played.

In one or more embodiments, the data store may be fully loaded into memory when an application reading the video file format is first accessed. A control stream may be preloaded into memory from one or more control data 726 from the data store 710 when the control data is fully loaded into memory. The control stream may be configured to read control data in advance of the corresponding video and/or audio data in the video file. In some embodiments, the control stream may be read by one or more processors of the MR system asynchronously to the video and/or audio streams, but executed synchronously. The control stream may comprise commands (e.g., control commands) and/or simple logic gates to determine a combination of a model and an animation to play at an appropriate time within a timeline of the video. The appropriate time within the timeline of the video corresponds with a corresponding time of a video stream and an audio stream.

In one or more embodiments, the control stream comprises only key frames. The animation stream, the video stream, and the audio stream may be configured to look ahead and behind one key frame. The one or more animation streams may correspond to animation instructions associated with one or more 3D models. Each animation stream of the one or more animation streams corresponds to at least one of a 3D model, a texture, or a material of the data store.

Feature richness of the mixed reality video format may be processed by a number of different control commands supported by a Mixed Reality Video Player. In some embodiments, the control data may include a set of control commands to allow a user to control objects and functions within the video and external to the video. In some embodiments, the control commands may be extensible. In some embodiments, the control commands may be updated. In some embodiments, the control commands may be dynamic. Examples of types of control commands may be 1) changing the speed of a movie (this could be, for example, based on a user history of fast forwarding or skipping a certain part of a movie, for example, fast forwarding through credits to get to the post-credit scenes), 2) providing a user prompt or automatically dimming the lights at the beginning of a movie and returning to original lighting at the end of a movie, 3) automatically dialing a pizza restaurant at the beginning of a movie, or 4) playing the movie differently depending on the user's eye gaze. In some embodiments, the control stream may be a full scripting language. In some embodiments, the mixed reality movie of the present disclosure is a movie or video comprising programming language. In some embodiments, the terms control data and control stream are used interchangeably.

Mixed Reality Video Player

A video player may interpret the 3D video format (e.g. video format 700). The video player may be a virtual and/or augmented/mixed reality video player. The video player may have access to the animation streams and the data within the data store 710 of the video format 700, so the video player may read and/or execute the video format. A typical video player may read data, separate audio data and/or streams from video data and/or streams, decode data, and display the video. However, the mixed reality video player may perform a few more actions such as loading a 3D model into memory, attaching an animation stream to the 3D model, and removing models and corresponding animations from memory when they are no longer needed, or not needed for a threshold period of time. Furthermore, additional interactive controls may allow users to make decisions to change the video or have portions of the video interact with the environment.

For example, a video may adapt to the environment by, for example, placing certain portions of the video content to be displayed on certain objects within the world (e.g., placing reporters 130 onto a user's physical chairs within the user's environment) using the additional interactive controls provided by the mixed reality video player. As another example, a user may be able to provide input pertaining to decisions made at certain points within a video that may alter and adjust the video content that may be displayed to the user and possibly how the video may end.

Video directors typically author traditional videos. With the mixed reality video player, a user may author the videos. For example, while playing the video, the video may ask the user if the user would want to attack the opponent. If the user chooses to attack, the user may lose and the video may reach a particular ending. However, if the user chooses not to attack, then another portion of the video may be played and a different ending to the video may be reached.

Figure 8:
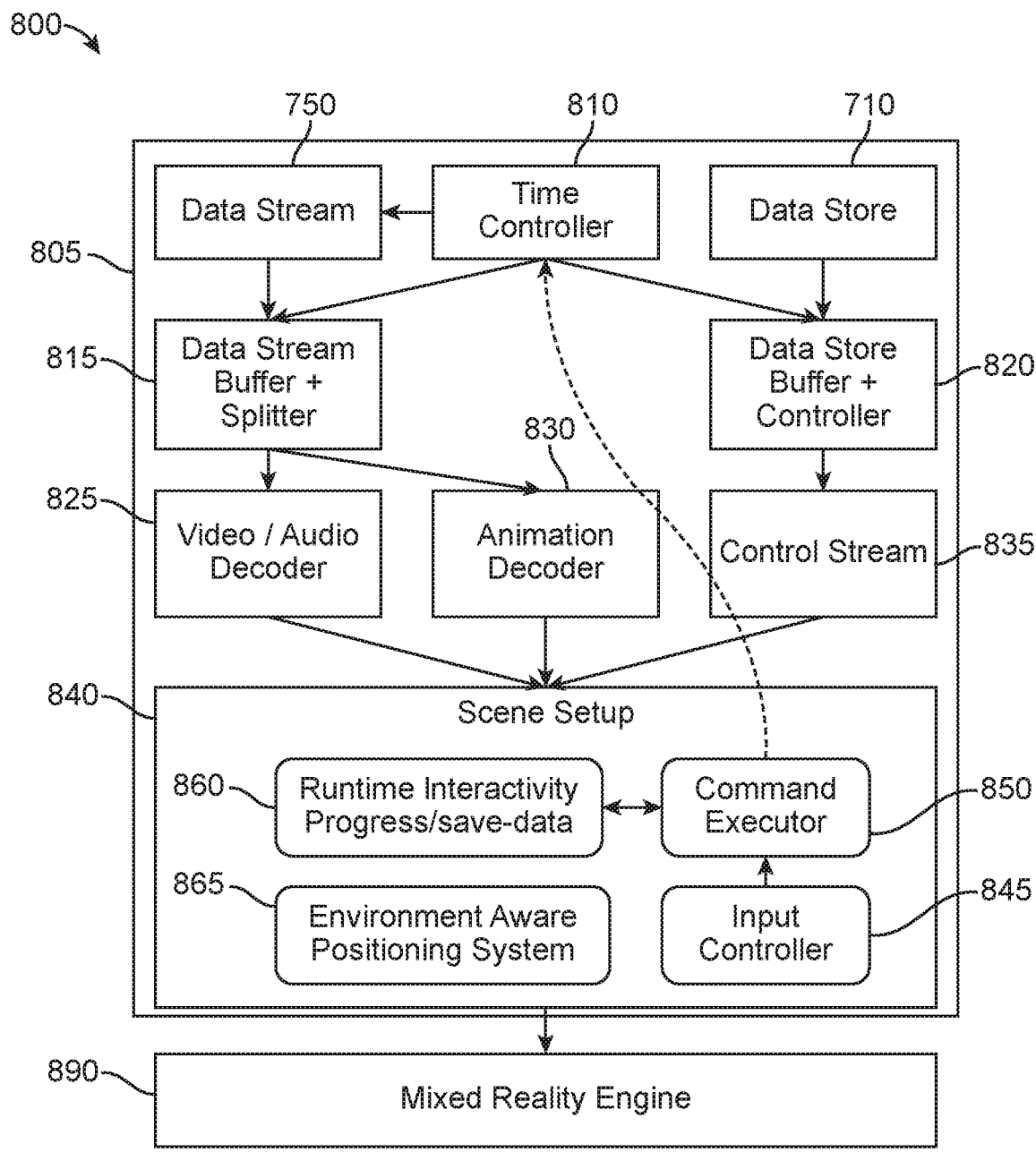
FIG. 8 shows a component diagram of a video player, according to some embodiments.

FIG. 8 shows a component diagram of a video player, according to some embodiments. Video player 805 may be a virtual and/or augmented/mixed reality player. Video player 805 may include a time controller 810, a data stream buffer and splitter 815, a data store buffer and controller 820, a video/audio decoder 825, an animation decoder 830, a control stream 835, and a scene setup module 840.

The time controller 810 may control a position of the video (e.g. movie) stream. In a normal video, the time controller may just increment the position of a video slider with respect to a timeline. Depending on commands received from a command executor 850 (disclosed below), the time lay of the video may jump to various sections of the video.

The data stream buffer and splitter 815 may be responsible for buffering in data and splitting the incoming file data streams 750 into individual streams such as video streams, audio streams, and animation streams. The data store buffer and controller 825 may be responsible for buffering in data from the data store 710 and determining which data to load in advance. Unlike the data stream buffer and splitter 815, data store buffer and controller 825 needs to establish which data to start streaming based on the control stream 835 and time controller 810.

Incoming data may be streamed into the video/audio decoder 825 and output from the video/audio decoder 825 may be written to one or more buffer frames. Audio may be routed to the audio handling portion of the engine. An animation decoder 830 may decode an animation stream into a format that may be applied directly to a model.

A control stream 835, as disclosed above, may be dynamically generated from the control data 726 from FIG. 7 and the time controller 810. The control stream 835 may indicate the commands to execute in a current frame (e.g. the frame being displayed to the user via the MR system).

A scene setup 840 may be a collection of modules that may provide a user with the additional interactive controls to allow the video to interact with the environment and/or allow a user to interact with the video. The scene setup 840 may include an input controller 845, a command executor 850, a runtime interactivity progress/save data 860, and an environment aware positioning system 865.

The input controller 845 may be responsible for delivering input from the user actions e.g., gestures, controller input, dialog boxes, environment (world object recognizers, e.g.: Chairs) etc.

Runtime interactivity progress/save data 860 may store current properties/states of the video. Similar to a video game, the runtime interactivity progress/save data 860 may be data that would be written to a save file for the video game as a user progresses through the video game. Here, as the user is progressing through the video, the runtime interactivity progress/save data 860 may store the video flow rendered and displayed thus far. In particular, if a user made certain decisions that sent the flow of the video to a particular section of the video file, the runtime interactivity progress/save data 860 may include the previous key frames displayed in a particular order to maintain a state of the video for the user by capturing the video history.

An environment aware positioning system 865 may be responsible for positioning the video, models etc. dynamically based on the user watching the video. For example, depending on the user's home setup, the 3D model and the video frame may be positioned suitably. A suitable position may be determined in a variety of ways. In some embodiments, the 3D model may have corresponding placement data. This placement data may specify a type of object (e.g. chair, floor, etc.) to place the object on or near, or may specify a set of characteristics needed to display the content (e.g. instead of specifying a chair, a horizontal surface between 1-3 feet above the floor could be specified instead). The environment aware positioning system 865 may communicate with a mixed reality engine (e.g. to access the passable world) in order to suitably position the 3D model.

Commands from the control stream 835 may be received, interpreted by a command executor 850, and appropriate logical actions may be executed. This may be the location where the initial integration of the models and animation streams takes place. The logical actions may be also determined, based at least in part, from the user input, and the result may be stored in the runtime interactivity data 860. Examples of one or more commands that may extend and enrich the capability of the video player may be added to the command executor 850. Some examples include: (1) present a model on the screen and associate to an animation stream; (2) reposition the model to a location in the user's environment (if there is no chair then a default location may be used); and (3) present an interaction dialog for the user to choose a decision.

Outputs of the mixed reality video player 805 may be sent to a mixed reality engine 890. The mixed reality engine 890 may be analogous to a game engine. The mixed reality engine 890 may be an engine capable of rendering videos and models, and may be used for a final composition of the scene based on the user's head-pose. Interactions and access to other VR and/or AR technology and/or capabilities may be interfaced through this mixed reality engine 890.

Figure 9:
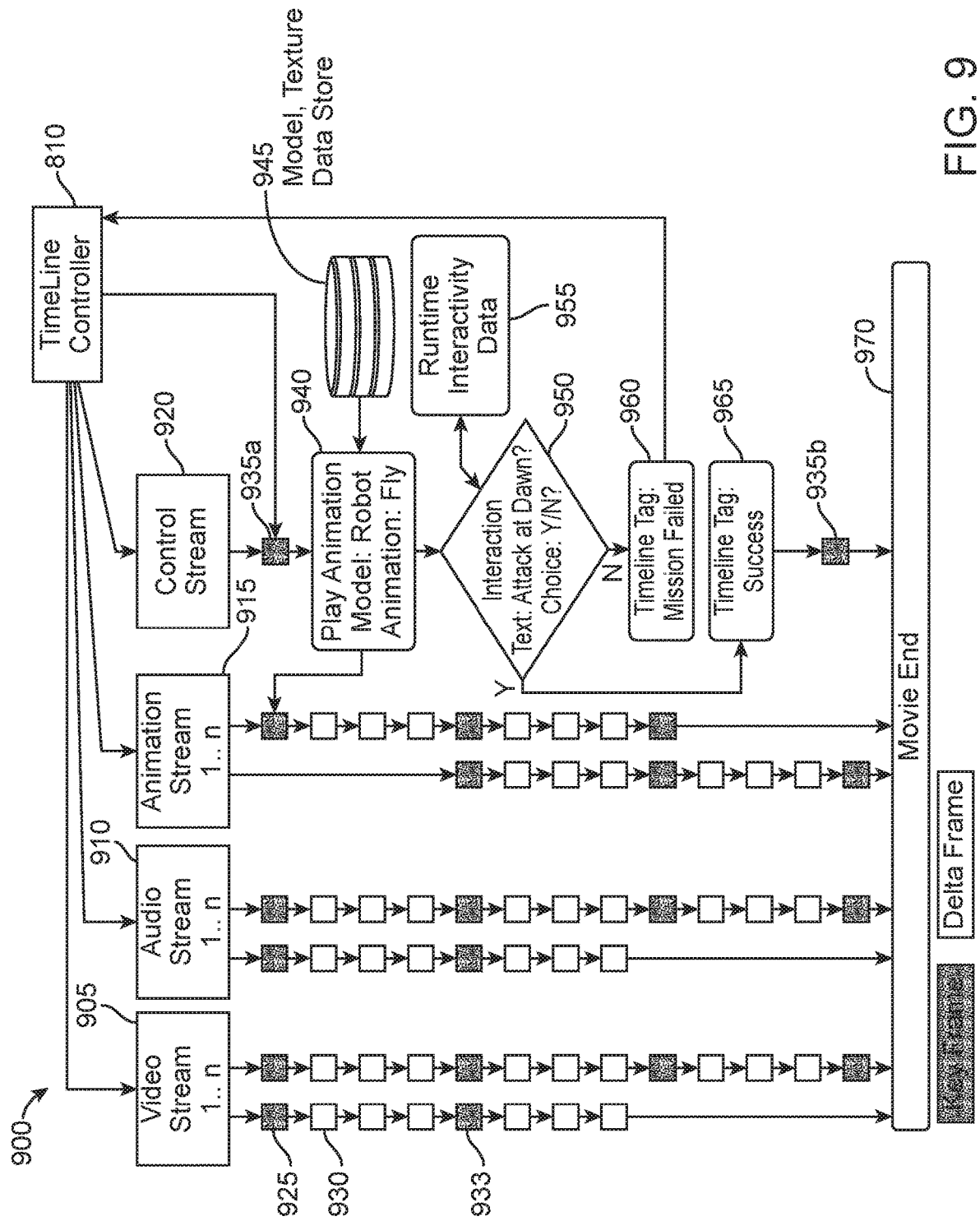
FIG. 9 shows a flow of a video player processing a video format, according to some embodiments.

FIG. 9 shows a flow of a video player processing a video format, according to some embodiments. The video player 900 may be a virtual and/or augmented/mixed reality video player. The flow of the video player 900 is depicted with respect to a timeline wherein time flows starting from the top of FIG. 9 down to the bottom of FIG. 9; ending at video end 970. Timeline controller 810 may be the time controller 810 from FIG. 8. The timeline controller 810 may control a position of the video stream, which may indicate the current frame being displayed to the user. The video player 900 may read/receive data from a mixed reality video file, in a mixed reality video file format. The video aspects of the mixed reality video format may be a stereoscopic 3D video. The mixed reality video file format may include animation streams 915, data store comprising control data, video streams 905, and audio streams 910. The animation streams 915, video streams 905, and audio streams 910 may correspond to the animation streams 780, video streams 760, and audio streams 770, respectively, from FIG. 7.

Video streams 905 may include one or more streams of video data of the video. Audio streams 910 may include one or more streams of audio data of the video. The one or more audio streams may correspond to various languages that the video may use, depending on a user chosen option. The one or more video streams may correspond to, for example, multiple views captured. In current video compression approaches, video and audio data may be data intensive such that the video and audio data may be streamed to a video player. As discussed above, common streaming compression technique involves sending in a key frame 925, which may be independent of all the frames, and subsequent delta frames 930, which may carry only differences from key frame 925, until another key frame 933 is encountered.

As disclosed above, animation streams 915 may include model animations, which may be applied to a compatible 3D model. The animation streams 915 may control how 3D models/meshes move and behave (e.g., movements, orientation, positions, etc.) relative to the video and audio streams (e.g., the video). Animation data may be streamed to the video player 900 in one or more animation streams. The one or more animation streams may correspond to one or more models/mesh/texture that may be displayed at a particular time during the video, the one or more models may be displayed outside of a display screen of the 3D video.

Control stream 920 may be dynamically generated from control data received from the data store and interpreted by the time controller 810. As disclosed above, Control stream 920 may be responsible for indicating the model/mesh/texture etc. to load from the data store 945 and link the model/mesh/texture to an associated animation stream (e.g., at 940) at an appropriate time within a timeline of the video to correspond with frames from the video streams 905 and audio streams 910. The control stream 920 may include key frames (e.g., key frame 935*a* and key frame 935*b*). The control stream 920 may include commands and simple logic gates to determine a combination of model and animation to play at the appropriate time within a timeline of the video.

In some embodiments, the control stream 920 is data that is not streamed from the video file but is instead preloaded into memory. Since control stream 920 is preloaded into memory, the video player 900 may look ahead in time into the timeline of the video and/or time of the video streams to determine when a 3D model from the data store may need to be preloaded into memory in anticipation of the 3D model being displayed, with or without animation. In some embodiments, a lead time for loading the model may be determined based on a size of data of the 3D model, a network bandwidth, and/or processing power of a user's virtual and/or augmented reality system (e.g., display system 104). In some embodiments, the control stream is streamed instead of pre-loaded into memory. In some embodiments, control stream and control data may be used interchangeably. In some embodiments, this may be because the control stream is the control data being executed. In some embodiments, this may be because they are the same thing. In some embodiments, this may be because the control data is being streamed.

In some embodiments, the video player 900 may receive a video file comprising video streams, audio streams, animation streams, and/or control data. A control stream may be generated from the control data and a time controller of the video player. At 940, a 3D model may be loaded into memory (not shown) based at least in part on the control stream prediction of when the 3D model may need to be displayed in the video. The video player may determine (e.g. calculate) a lead time for loading the 3D model to ensure the 3D model is ready to be displayed to the user, with or without animation. If animation is to be included with the 3D model, the control stream may attach the 3D object to an animation stream by associating a link between the loaded 3D model and an animation stream from the animation streams 915. The video may be displayed to a user using a VR and/or AR device (e.g., display system 104). The user may see the 3D video displayed on a virtual television such that at certain portions of the video, a 3D object may appear to exit the front plane of the virtual television and move around the user's environment, and optionally re-enter the virtual television.

In another embodiment, the control stream 920, at 950, may instruct the video player 900 to display a question to the user, for example, whether to attack at dawn? If the user chooses, "YES" attack at dawn, the control stream, at 965, may tag a "success" to the timeline and communicate the mission "success" tag to the timeline controller 810. Alternatively, if the user chooses "NO" do not attack at dawn, the control stream, at 960 may tag a "failed" to the timeline and communicate the mission "failed" tag to the timeline controller 810.

The timeline controller 810, after receiving the timeline tags for the mission, may skip/jump the timeline to the appropriate portion of the video to continue the video, whether it's to the portion of the video that continues based on a successful mission or the portion of the video that continues based on a failed mission. The interactions received from the user may comprise at least one of a head pose, an eye tracking, an eye gaze, hand gestures of the user, totem gestures or inputs, or an object recognizer. At 955, the state of the video may be stored with the runtime interactivity data to capture the answer provided by the user. This embodiment discloses how the video player 900, receiving a video file (e.g., a mixed reality video format file) may display a user interactive 3D video using the control stream 920 to capture user interactions that direct which portions of the video should be displayed next, thus allowing the user to direct and control how a storyline of the video may end. In some embodiments, the runtime interactivity data 955 may interpret, at least in part, the control commands. For example, 955 may interpret the user selection when a control command comprises a user choice. The runtime interactivity data may, in some embodiments, be passed to the command executor 850 where the user selection can impact the state of the video. In some embodiments, 955 may interpret a control command that does not comprise a user choice. For example, a control command may function to automatically censor video content based on the age of a user (which may be stored in a user's profile on the mixed reality system).

A mixed reality video editor (not shown) for creating and editing the mixed reality video file format may include tools for editing the video streams, audio streams, the animation streams, and the data store of the mixed reality video format. The tools, for example, may allow a user to (1) create or import models into the data store, (2) define animation streams from saved animation streams and/or create new animations streams for controlling models, (3) associate animation streams to compatible models, (4) define when models may be pre-loaded, for example, based on a configured user bandwidth and processing powers of the user's VR and/or AR system, (5) define portions of the video and audio streams that may be displayed on objects in a user's environment, and/or (6) define how and/or what questions may be asked of users viewing the video and how each response from the users may skip to which portions of the video, etc.

A mixed reality video file format may comprise at least one animation stream and a data store for adding additional assets into a traditional video file format to implement one or more embodiments of the present disclosure. A mixed reality video player may be used to interpret and process the mixed reality video within the mixed reality video file format.

The video player, interpreting and executing the control stream may allow the VR and/or AR system to display 3D videos in a new and novel way. For example, displaying 3D objects to appear as though they are coming out of a display screen may be achieved by preloading a 3D model into memory based on anticipation prediction of when the 3D model needs to be displayed, and attaching the 3D model to an animation stream for controlling movements of the 3D model. This may improve a virtual and/or augmented reality system's ability for displaying 3D models in combination with 3D videos to provide a more realistic view of a 3D video where 3D objects within the 3D video may appear to actually spill out or come out of a traditional display screen displaying the traditional 3D videos. In some embodiments, the addition of the animation streams 915, the control data, and the control stream 920, when interpreted by the video player 900, allows the VR and/or AR system to display 3D videos with 3D objects that may actually spill out/come out of the display screen in an efficient manner which reduces the processing power of a computer and reduces the amount of memory that may be needed to produce the 3D video as compared to other techniques such as Voxel and/or Volumetric based video streams.

Additional Embodiments

Additional embodiments of the disclosure are described below. These additional embodiments may incorporate elements from the embodiments disclosed above.

1. An embodiment comprising:
   identifying a portal in a final 3D render world, the portal being an opening in a surface of the final 3D render world; and
   rendering a first 2D stereoscopic image and a second 2D stereoscopic image into the portal of the final 3D render world.
2. The method of embodiment 1, comprising displaying the rendered final 3D render world to a user through an augmented reality device.
3. The method of embodiment 1, wherein the first 2D stereoscopic image is for a right eye and the second 2D stereoscopic image is for a left eye.
4. The method of embodiment 3, wherein the first 2D stereoscopic image and the second 2D stereoscopic image are sourced from a traditional 3D video.
5. The method of embodiment 3, wherein the first 2D stereoscopic image and the second 2D stereoscopic image are sourced from two virtual render cameras located within a different part of the 3D render world.
6. The method of embodiment 3, wherein the first 2D stereoscopic image and the second 2D stereoscopic image are sourced from two cameras capturing real world content.
7. The method of embodiment 3, wherein the first 2D stereoscopic image and the second 2D stereoscopic image are sourced from a different 3D render world.
8. The method of embodiment 7, wherein the different 3D render world is a portal icon.
9. The method of embodiment 1, wherein the portal is a virtual television screen.
10. A virtual and/or augmented reality display system, comprising:
    a final 3D render space; and
    a module for processing data, wherein the module is stored in a memory, the module configured to perform:
       identifying a portal in the final 3D render world, the portal being an opening in a surface of the final 3D render world; and
       rendering a first 2D stereoscopic image and a second 2D stereoscopic image into the portal of the final 3D render world.
11. The virtual and/or augmented reality display system of embodiment 10, further comprising displaying the rendered final 3D render world to a user.
12. The virtual and/or augmented reality display system of embodiment 10, wherein the first 2D stereoscopic image is for a right eye and the second 2D stereoscopic image is or a left eye.
13. The virtual and/or augmented reality display system of embodiment 12, wherein the first 2D stereoscopic image and the second 2D stereoscopic image are sourced from a traditional 3D video.
14. The virtual and/or augmented reality display system of embodiment 12, wherein the first 2D stereoscopic image and the second 2D stereoscopic image are sourced from two virtual render cameras located within a different part of the 3D render world.
15. The virtual and/or augmented reality display system of embodiment 12, wherein the first 2D stereoscopic image and the second 2D stereoscopic image are sourced from two cameras capturing real world content.
16. The virtual and/or augmented reality display system of embodiment 12, wherein the first 2D stereoscopic image and the second 2D stereoscopic image are sourced from a second 3D render world.
17. The virtual and/or augmented reality display system of embodiment 16, wherein the second 3D render world is a portal icon.
18. The virtual and/or augmented reality display system of embodiment 10, wherein the portal is a virtual television screen.
19. A method of displaying 3D video in a virtual and/or augmented reality environment, the method comprising:
    identifying a 3D video;

identifying a volume space for displaying the 3D video in a portion of a virtual and/or augmented reality environment; and
rendering the 3D video within the volume space.

20. The method of embodiment 19, wherein the 3D video is a stereoscopic 3D video.

21. The method of embodiment 19, wherein the volume space is a portal view of a 3D object.

22. The method of embodiment 21, wherein the 3D object is a virtual television having a planar viewing display.

23. The method of embodiment 22, wherein the 3D video is rendered within the planar viewing display of the virtual television.

24. The method of embodiment 19, wherein a first depth information from the 3D video is added to a second depth information from a first location of the portion of the virtual and/or augmented environment volume space to a second location of a user viewing the 3D video.

25. A virtual and/or augmented reality display system comprising:
a camera to capture a virtual and/or augmented reality environment; and
a module for processing data, wherein the module is stored in a memory, the module;
identifying a 3D video,
identifying a volume space for displaying the 3D video in a portion of the virtual and/or augmented reality environment, and
rendering the 3D video within the volume space.

26. The virtual and/or augmented reality display system of embodiment 25, wherein the 3D video is a stereoscopic 3D video.

27. The virtual and/or augmented reality display system of embodiment 25, wherein the volume space is a portal view of a 3D object.

28. The virtual and/or augmented reality display system of embodiment 27, wherein the 3D object is a virtual television having a planar viewing display.

29. The virtual and/or augmented reality display system of embodiment 28, wherein the 3D video is rendered within the planar viewing display of the virtual television.

30. The virtual and/or augmented reality display system of embodiment 25, wherein a first depth information from the 3D video is added to a second depth information from a first location of the portion of the virtual and/or augmented environment volume space to a second location of a user viewing the 3D video.

31. A method of displaying 3D video that extends beyond a surface of a display screen, the method comprising:
identifying a 3D video;
generating one or more 3D models corresponding to the 3D video; and
rendering the one or more 3D models at an appropriate trigger time along with a rendering of the 3D video.

32. The method of embodiment 31, wherein the 3D video is a stereoscopic 3D video.

33. The method of embodiment 32, wherein the one or more 3D models are generated with animations.

34. The method of embodiment 33, further comprising displaying the animations of the one or more 3D models outside of a display screen of the 3D video.

35. The method of embodiment 34, wherein the animations of the one or more 3D models appear to exit a planar surface of the 3D video and come out into a 3D environment of a user.

35a. The method of embodiment 34, wherein the animations of the one or more 3D models appear to exit a non-planar surface of the 3D video and come out into a 3D environment of a user.

36. The method of embodiment 31, further comprising:
rendering the one or more 3D models onto one or more video panes, and
displaying the one or more video panes at a same time for one or more viewing orientations.

37. The method of embodiment 32, wherein the stereoscopic 3D video is displayed with the one or more 3D models.

38. The method of embodiment 31, wherein a depth information is factored into the rendering of the 3D video and the one or more 3D models, the depth information comprising a distance from a user of a virtual and/or augmented reality device to the 3D video and respective one or more 3D models displayed within a virtual and/or augmented reality environment.

39. The method of embodiment 31, wherein the 3D video comprises control data, wherein the control data instructs a video player to render the one or more 3D models at the appropriate trigger time along with the rendering of the 3D video.

39a. The method of embodiment 39, wherein the control data comprise a set of control commands for controlling objects and functions within the 3D video and external to the 3D video.

39b. The method of embodiment 39a, wherein the control commands (e.g., the set of control commands) is at least one of: extensible, updateable, or dynamic.

39c. The method of embodiment 39b, wherein the control commands comprise at least one of: changing the speed of the 3D video, providing a user prompt for dimming lighting in user environment at a beginning of the 3D video, dialing a pizza restaurant at a beginning of the 3D video, or playing the 3D video differently based at least in part on a user's eye gaze.

39d. The method of embodiment 31, wherein the 3D video is a 3D movie, the 3D movie comprising programming language.

40. The method of embodiment 31, wherein the rendering of the one or more 3D models is based at least in part on a Voxel based video stream.

41. A display system for displaying 3D video that extends beyond a surface of a display screen, the system comprising:
an augmented reality head-mounted display system;
a 3D final render world;
two or more virtual cameras; and
one or more modules for processing data, wherein the one or more modules are stored in one or more memory, the one or more modules configured to perform:
identifying a 3D video,
generating one or more 3D models corresponding to the 3D video, and
rendering the one or more 3D models at an appropriate trigger time along with a rendering of the 3D video.

42. The virtual and/or augmented reality display system of embodiment 41, wherein the 3D video is a stereoscopic 3D video.

43. The virtual and/or augmented reality display system of embodiment 42, wherein the one or more 3D models are generated with animations.

44. The virtual and/or augmented reality display system of embodiment 43, wherein the module further comprises displaying the animations of the one or more 3D models outside of a display screen of the 3D video.

45. The virtual and/or augmented reality display system of embodiment 44, wherein the animations of the one or more 3D models appear to exit a planar surface of the 3D video and come out into a 3D environment of a user.

45a. The virtual and/or augmented reality display system of embodiment 44, wherein the animations of the one or more 3D models appear to exit a non-planar surface of the 3D video and come out into a 3D environment of a user.

46. The virtual and/or augmented reality display system of embodiment 41, wherein the one or more modules are further configured to perform:
rendering the one or more 3D models onto one or more video panes, and
displaying the one or more video panes at a same time for one or more viewing orientations.

47. The virtual and/or augmented reality display system of embodiment 42, wherein the stereoscopic 3D video is displayed with the one or more 3D models.

48. The virtual and/or augmented reality display system of embodiment 41, wherein a depth information is factored into the rendering of the 3D video and the one or more 3D models, the depth information comprising a distance from a user of a virtual and/or augmented reality device to the 3D video and respective one or more 3D models displayed within a virtual and/or augmented reality environment.

49. The virtual and/or augmented reality display system of embodiment 41, wherein the 3D video has a video file format comprising control data, wherein the control data instructs a video player to render the one or more 3D models at the appropriate trigger time along with the rendering of the 3D video.

49a. The virtual and/or augmented reality display system of embodiment 49, wherein the control data comprise a set of control commands for controlling objects and functions within the 3D video and external to the 3D video.

49b. The virtual and/or augmented reality display system of embodiment 49a, wherein the control commands (e.g., the set of control commands) is at least one of: extensible, updateable, or dynamic.

49c. The virtual and/or augmented reality display system of embodiment 49b, wherein the control commands comprise at least one of: changing the speed of the 3D video, providing a user prompt for dimming lighting in user environment at a beginning of the 3D video, dialing a pizza restaurant at a beginning of the 3D video, or playing the 3D video differently based at least in part on a user's eye gaze.

49d. The virtual and/or augmented reality display system of embodiment 31, wherein the 3D video is a 3D movie, the 3D movie comprising programming language.

50. The virtual and/or augmented reality display system of embodiment 41, wherein the rendering of the one or more 3D models is based at least in part on a Voxel based video stream.

51. A method comprising:
placing two first stage cameras in a 3D environment;
capturing one or more pairs of 2D images from the two first stage cameras;
placing the one or more pairs of 2D images into a location within a final stage scene; and
rendering the final stage scene from two final stage cameras.

52. The method of embodiment 51, further comprising displaying the final stage scene via a virtual and/or augmented reality device.

53. The method of embodiment 51, wherein the location is a portal.

54. The method of embodiment 51, wherein a first camera of the two first stage cameras capture 2D images from a left eye perspective and a second camera of the two first stage camera captures 2D images from a right eye perspective.

55. The method of embodiment 51, wherein the one or more other pairs of two 2D images are captured from two final stage cameras corresponding to two eyes of the user.

56. The method of embodiment 55, wherein the two first stage cameras are in different locations of the 3D environment than the final stage 2 render cameras.

57. The method of embodiment 51, wherein the two first stage cameras are virtual cameras and the 3D environment is a 3D virtual world.

58. The method of embodiment 51, wherein the 3D environment is a real world.

59. A virtual and/or augmented reality display system, comprising:
two first stage cameras placed in a 3D environment, the two first stage cameras capturing one or more pairs of 2D images;
two final stage cameras, the two final stage cameras capturing a final stage scene; and
a module for processing data, wherein the module is stored in a memory, the module configured to perform:
placing the one or more pairs of 2D images into a location within the final stage scene; and
rendering the final stage scene from one or more other pairs of 2D images captured from the two final stage cameras.

60. The virtual and/or augmented reality display system of embodiment 59, further comprising displaying the final stage scene.

61. The virtual and/or augmented reality display system of embodiment 59, wherein the location is a portal.

62. The virtual and/or augmented reality display system of embodiment 59, wherein a first camera of the two first stage cameras capture 2D images from a left eye perspective and a second camera of the two first stage camera captures 2D images from a right eye perspective.

63. The virtual and/or augmented reality display system of embodiment 59, wherein the one or more other pairs of two 2D images are captured from two final stage cameras corresponding to two eyes of the user.

64. The virtual and/or augmented reality display system of embodiment 63, wherein the two first stage cameras are in different locations of the 3D environment than the final stage 2 render cameras.

65. The virtual and/or augmented reality display system of embodiment 59, wherein the two first stage cameras are virtual cameras and the 3D environment is a 3D render world.

66. The virtual and/or augmented reality display system of embodiment 59, wherein the 3D environment is a real world.

67. A method comprising placing a first 3D content from a first source into a second 3D content from a second source.

68. The method of embodiment 67, further comprising displaying the second 3D content via a virtual and/or augmented reality device.

69. The method of embodiment 67, wherein the first 3D content is placed into a portal within the second 3D content.

70. The method of embodiment 67, wherein a first camera of the first source captures 2D images from a left eye perspective and a second camera of the first source captures 2D images from a right eye perspective.

71. The method of embodiment 67, wherein another pair of two 2D images is captured from two other cameras from the second source, the pair of two 2D images corresponding to two eyes of a user viewing a scene from the second source.

72. The method of embodiment 67, wherein two cameras from the first source are in different locations of a 3D environment than two other cameras from the second source.

73. The method of embodiment 67, wherein the first 3D content is captured from two virtual cameras and the first source is a 3D virtual world.

74. The method of embodiment 67, wherein the first source is a real world.

75. A virtual and/or augmented reality display system comprising:
a camera to capture a virtual and/or augmented reality environment; and
a module for processing data, wherein the module is stored in a memory, the module when executed, performs a process of placing a first 3D content from a first source into a second 3D content from a second source.

76. The virtual and/or augmented reality display system of embodiment 75, wherein the module when executed, performs a process further comprising displaying the second 3D content via a virtual and/or augmented reality device.

77. The virtual and/or augmented reality display system of embodiment 75, wherein the first 3D content is placed into a portal within the second 3D content.

78. The virtual and/or augmented reality display system of embodiment 75, wherein a first camera of the first source captures 2D images from a left eye perspective and a second camera of the first source captures 2D images from a right eye perspective.

79. The virtual and/or augmented reality display system of embodiment 75, wherein another pair of two 2D images is captured from two other cameras from the second source, the pair of two 2D images corresponding to two eyes of a user viewing a scene from the second source.

80. The virtual and/or augmented reality display system of embodiment 75, wherein two cameras from the first source are in different locations of a 3D environment than two other cameras from the second source.

81. The virtual and/or augmented reality display system of embodiment 75, wherein the first 3D content is captured from two virtual cameras and the first source is a 3D virtual world.

82. The virtual and/or augmented reality display system of embodiment 75, wherein the first source is a real world.

83. A method comprising placing a first set of stereoscopic images inside a second set of stereoscopic images.

84. The method of embodiment 83, further comprising displaying the second set of stereoscopic images via a virtual and/or augmented reality device.

85. The method of embodiment 83, wherein the first set of stereoscopic images is placed into a portal within the second set of stereoscopic images.

86. The method of embodiment 83, wherein the first set of stereoscopic images are captured by a first camera that captures 2D images from a left eye perspective and a second camera that captures 2D images from a right eye perspective.

87. The method of embodiment 83, wherein the second set of stereoscopic images are captured by two other cameras, the two other cameras capturing the second set of stereoscopic images, the two other cameras corresponding to two eyes of a user viewing a scene showing the first set of stereoscopic images in a portal.

88. The method of embodiment 87, wherein the first set of stereoscopic images are captured from two cameras from a different location than the two other cameras capturing the second set of stereoscopic images.

89. The method of embodiment 83, wherein the first set of stereoscopic images is captured from two virtual cameras in a 3D virtual world.

90. The method of embodiment 83, wherein the first set of stereoscopic images is captured from two cameras in a real world.

91. A virtual and/or augmented reality display system comprising:
a camera to capture a virtual and/or augmented reality environment; and
a module for processing data, wherein the module is stored in a memory, the module when executed, performs a process of placing a first set of stereoscopic images inside a second set of stereoscopic images.

92. The virtual and/or augmented reality display system of embodiment 91, wherein the module when executed, performs a process further comprising displaying the second set of stereoscopic images via a virtual and/or augmented reality device.

93. The virtual and/or augmented reality display system of embodiment 91, wherein the first set of stereoscopic images is placed into a portal within the second set of stereoscopic images.

94. The virtual and/or augmented reality display system of embodiment 91, wherein the first set of stereoscopic images are captured by a first camera that captures 2D images from a left eye perspective and a second camera that captures 2D images from a right eye perspective.

95. The virtual and/or augmented reality display system of embodiment 91, wherein the second set of stereoscopic images are captured by two other cameras, the two other cameras capturing the second set of stereoscopic images, the two other cameras corresponding to two eyes of a user viewing a scene showing the first set of stereoscopic images in a portal.

96. The virtual and/or augmented reality display system of embodiment 95, wherein the first set of stereoscopic images are captured from two cameras from a different location than the two other cameras capturing the second set of stereoscopic images.

97. The virtual and/or augmented reality display system of embodiment 91, wherein the first set of stereoscopic images is captured from two virtual cameras in a 3D virtual world.

98. The virtual and/or augmented reality display system of embodiment 91, wherein the first set of stereoscopic images is captured from two cameras in a real world.

99. A method comprising:
identifying two input images, wherein one input image corresponds to a left eye perspective and a second input image corresponds to a right eye; and
placing the two input images into a specified location within a final 3D render world.

100. The method of embodiment 99, further comprising displaying the final 3D render world via a virtual and/or augmented reality device.

101. The method of embodiment 99, wherein the specified location is a portal within the final 3D render world.

102. The method of embodiment 99, wherein the two input images are captured by a first camera that captures 2D images from a left eye perspective and a second camera that captures 2D images from a right eye perspective.

103. The method of embodiment 99, wherein the final 3D render world is captured by two other cameras, the two other cameras capturing the final 3D render world, the two other cameras corresponding to two eyes of a user viewing a scene showing the two input images in a portal.

104. The method of embodiment 103, wherein the two input images are captured from two cameras from a different location than the two other cameras capturing the final 3D render world.

105. The method of embodiment 99, wherein the two input images are captured from two virtual cameras in a 3D virtual world.

106. The method of embodiment 99, wherein the two input images are captured from two cameras in a real world.

107. A virtual and/or augmented reality display system comprising:
a camera to capture a virtual and/or augmented reality environment; and
a module for processing data, wherein the module is stored in a memory, the module when executed, performs a process of:
identifying two input images, wherein one input image corresponds to a left eye perspective and a second input image corresponds to a right eye, and
placing the two input images into a specified location within a final 3D render world.

108. The virtual and/or augmented reality display system of embodiment 107, wherein the module when executed, performs a process further comprising displaying the final 3D render world via a virtual and/or augmented reality device.

109. The virtual and/or augmented reality display system of embodiment 107, wherein the specified location is a portal within the final 3D render world.

110. The virtual and/or augmented reality display system of embodiment 107, wherein the two input images are captured by a first camera that captures 2D images from a left eye perspective and a second camera that captures 2D images from a right eye perspective.

111. The virtual and/or augmented reality display system of embodiment 107, wherein the final 3D render world is captured by two other cameras, the two other cameras capturing the final 3D render world, the two other cameras corresponding to two eyes of a user viewing a scene showing the two input images in a portal.

112. The virtual and/or augmented reality display system of embodiment 111, wherein the two input images are captured from two cameras from a different location than the two other cameras capturing the final 3D render world.

113. The virtual and/or augmented reality display system of embodiment 107, wherein the two input images are captured from two virtual cameras in a 3D virtual world.

114. The virtual and/or augmented reality display system of embodiment 107, wherein the two input images are captured from two cameras in a real world.

115. A method comprising:
identifying a 3D data input; and
placing the 3D data input into a location within a virtual final 3D render world.

116. The method of embodiment 115, further comprising displaying the virtual final 3D render world via a virtual and/or augmented reality device.

117. The method of embodiment 115, wherein the location is a portal within the virtual final 3D render world.

118. The method of embodiment 115, wherein the 3D data input is captured by a first camera that captures 2D images from a left eye perspective and a second camera that captures 2D images from a right eye perspective.

119. The method of embodiment 115, wherein the virtual final 3D render world is captured by two other cameras, the two other cameras capturing the virtual final 3D render world, the two other cameras corresponding to two eyes of a user viewing a scene showing the 3D data input in a portal.

120. The method of embodiment 119, wherein the 3D data input is captured from two cameras from a different location than the two other cameras capturing the virtual final 3D render world.

121. The method of embodiment 115, wherein the 3D data input is captured from two virtual cameras in a 3D virtual world.

122. The method of embodiment 115, wherein the 3D data input is captured from two cameras in a real world.

123. A virtual and/or augmented reality display system comprising:
a camera to capture a virtual and/or augmented reality environment; and
a module for processing data, wherein the module is stored in a memory, the module when executed, performs a process of:
identifying a 3D data input, and
placing the 3D data input into a location within a virtual final 3D render world.

124. The virtual and/or augmented reality display system of embodiment 123, wherein the module when executed, performs a process further comprising displaying the virtual final 3D render world via a virtual and/or augmented reality device.

125. The virtual and/or augmented reality display system of embodiment 123, wherein the location is a portal within the virtual final 3D render world.

126. The virtual and/or augmented reality display system of embodiment 123, wherein the 3D data input is captured by a first camera that captures 2D images from a left eye perspective and a second camera that captures 2D images from a right eye perspective.

127. The virtual and/or augmented reality display system of embodiment 123, wherein the virtual final 3D render world is captured by two other cameras, the two other cameras capturing the virtual final 3D render world, the two other cameras corresponding to two eyes of a user viewing a scene showing the 3D data input in a portal.

128. The virtual and/or augmented reality display system of embodiment 127, wherein the two input images are captured from two cameras from a different location than the two other cameras capturing the final 3D render world.

129. The virtual and/or augmented reality display system of embodiment 123, wherein the 3D data input is captured from two virtual cameras in a 3D virtual world.

130. The virtual and/or augmented reality display system of embodiment 123, wherein the 3D data input is captured from two cameras in a real world.

131. A video file format comprising:
one or more animation streams;
a data store; and
at least one of a video stream or an audio stream.

132. The video file format of embodiment 131, wherein the data store comprises:
one or more control data; and one or more 3D models.

132a. The video file format of embodiment 131, wherein the data store comprises:
one or more textures; and
one or more materials.

133. The video file format of embodiment 132, wherein the control data is fully loaded into memory when an application reading the video file format is first accessed.

134. The video file format of embodiment 133, wherein a control stream is preloaded into memory from one or more control data from the data store when the control data is fully loaded into memory.

134a. The video file format of embodiment 134, wherein the control stream is a full scripting language.

135. The video file format of embodiment 134, wherein the control stream is configured to look more ahead into time corresponding to a timeline than the video streams or the audio streams.

136. The video file of embodiment 134, wherein the control stream comprises commands and simple logic gates to determine a combination of a model and an animation to play at an appropriate time within a timeline of the video.

137. The video file format of embodiment 136, wherein the appropriate time within the timeline of the video corresponds with a corresponding time of a video stream and an audio stream.

138. The video file of embodiment 133, wherein the control stream comprises key frames.

139. The video file format of embodiment 131, wherein the animation stream, the video stream, and the audio stream are configured to look ahead and behind one key frame.

140. The video file format of embodiment 131, wherein the one or more animation streams correspond to animation instructions associated to one or more 3D models.

141. The video file format of embodiment 131, wherein each animation stream of the one or more animation streams corresponds to at least one of a 3D model, a texture, or a material of the data store.

142. A method comprising:
receiving a video file of a video, the video file comprising:
one or more animation streams;
a data store comprising control data; and
at least one of a video stream or an audio stream;
dynamically generating a control stream from the control data and a timeline controller;
loading a model of a 3D object received from the data store; and attaching the 3D object to an animation stream of the one or more animation streams.

143. The method of embodiment 142, wherein the one or more animation streams correspond to respective 3D models stored within a data store.

144. The method of embodiment 142, wherein the one or more animation streams control movements, orientation and positions of 3D objects relative to the video.

145. The method of embodiment 142, wherein the model of the 3D object is loaded based at least in part on the control streaming looking ahead in time of the video streams and anticipating when the 3D object needs to be displayed.

146. The method of embodiment 145, further comprising determining a lead time for loading the model is based at least on one of a size of the model, a network bandwidth, or processing power of a user's virtual and/or augmented reality system.

147. The method of embodiment 142, further comprising displaying the video via a virtual and/or augmented reality device.

148. The method of embodiment 142, wherein the data store is fully loaded into memory when the video file is received.

149. The method of embodiment 142, wherein the control stream is fully loaded into memory when the control stream is generated.

150. The method of embodiment 142, wherein the video is a stereoscopic 3D video.

151. A computer system implementing a mixed reality video player, comprising:
a computer processor to execute a set of program code instructions; and
a memory to hold the program code instructions, in which the program code instructions comprises program code to perform:
receiving a video file of a video, the video file comprising:
one or more animation streams,
a data store comprising control data, and
at least one of a video stream or an audio stream,
dynamically generating a control stream from the control data and a timeline controller,
loading a model of a 3D object received from the data store, and
attaching the 3D object to an animation stream of the one or more animation streams.

152. The computer system of embodiment 151, wherein the one or more animation streams correspond to respective 3D models stored within a data store.

153. The computer system of embodiment 151, wherein the one or more animation streams control movements, orientation and positions of 3D objects relative to the video.

154. The computer system of embodiment 151, wherein the model of the 3D object is loaded based at least in part on the control streaming looking ahead in time of the video streams and anticipating when the 3D object needs to be displayed.

155. The computer system of embodiment 154, wherein the program code instructions comprise program code to further perform determining a lead time for loading the model is based at least on one of a size of the model, a network bandwidth, or processing power of a user's virtual and/or augmented reality system.

156. The computer system of embodiment 151, wherein the program code instructions comprise program code to further perform displaying the video via a virtual and/or augmented reality device.

157. The computer system of embodiment 151, wherein the data store is fully loaded into memory when the video file is received.

158. The computer system of embodiment 151, wherein the control stream is fully loaded into memory when the control stream is generated.

159. The computer system of embodiment 151, wherein the video is a stereoscopic 3D video.

160. A method comprising:
receiving a video file of a video, the video file comprising:
one or more animation streams;
a data store comprising control data; and
at least one of a video stream or an audio stream;
dynamically generating a control stream from the control data and a timeline controller;
requesting a user interaction answering a question displayed to the user at a point in time of the video;
receiving an answer to the question via the user interaction;
notifying a timeline controller of the answer;

skipping to an appropriate portion of the video corresponding to the answer; and displaying the video from the appropriate portion.

161. The method of embodiment 160, further comprising displaying the video via a virtual and/or augmented reality device.

162. The method of embodiment 160, wherein the data store is fully loaded into memory when the video file is received.

163. The method of embodiment 160, wherein the control stream is fully loaded into memory when the control stream is generated.

164. The method of embodiment 160, wherein the video is a stereoscopic 3D video.

165. The method of embodiment 160, wherein the control stream controls when to display a question to the user at the point in time of the video is based at least in part on data from the data store.

166. The method of embodiment 160, wherein the user interaction comprises at least one of a head pose, an eye tracking, an eye gaze, hand gestures of the user, totem gestures, or an object recognizer.

167. The method of embodiment 160, wherein the timeline controller controls a position of the video stream.

168. The method of embodiment 160, further comprising storing a state of the video with a runtime interactivity data based at least in part on the answer received.

169. The method of embodiment 160, wherein the question displayed to the user corresponds to questions that changes how a storyline of the video may end.

170. A computer system implementing a mixed reality video player, comprising:
a computer processor to execute a set of program code instructions; and
a memory to hold the program code instructions, in which the program code instructions comprises program code to perform:
receiving a video file of a video, the video file comprising
one or more animation streams;
a data store comprising control data; and
at least one of a video stream or an audio stream;
dynamically generating a control stream from the control data and a timeline controller;
requesting a user interaction answering a question displayed to the user at a point in time of the video;
receiving an answer to the question via the user interaction; notifying a timeline controller of the answer;
skipping to an appropriate portion of the video corresponding to the answer; and
displaying the video from the appropriate portion.

171. The computer system of embodiment 170, wherein the program code instructions comprise program code to further perform displaying the video via a virtual and/or augmented reality device.

172. The computer system of embodiment 170, wherein the data store is fully loaded into memory when the video file is received.

173. The computer system of embodiment 170, wherein the control stream is fully loaded into memory when the control stream is generated.

174. The computer system of embodiment 170, wherein the video is a stereoscopic 3D video.

175. The computer system of embodiment 170, wherein the control stream controls when to display a question to the user at the point in time of the video is based at least in part on data from the data store.

176. The computer system of embodiment 170, wherein the user interaction comprises at least one of a head pose, an eye tracking, an eye gaze, hand gestures of the user, totem gestures, or an object recognizer.

177. The computer system of embodiment 170, wherein the timeline controller controls a position of the video stream.

178. The computer system of embodiment 170, wherein the program code instructions comprise program code to further perform storing a state of the video with a runtime interactivity data based at least in part on the answer received.

179. The computer system of embodiment 170, wherein the question displayed to the user corresponds to questions that changes how a storyline of the video may end.

180. A computer implemented method of displaying an environment aware 3D video in a virtual and/or augmented reality environment, the method comprising:
identifying a 3D video;
receiving, from one or more sensors, environment information of a user environment, the environment information identifying objects within the environment; and
rendering a portion of the 3D video onto one or more objects identified from the environment.

181. The method of embodiment 180, wherein the 3D video is a stereoscopic 3D video.

182. The method of embodiment 180, wherein the environment is a physical environment of the user.

183. The method of embodiment 180, wherein the one or more sensors comprise one or more cameras for capturing scene information of the physical environment.

184. The method of embodiment 180, further comprising:
interpreting scene information captured from the one or more sensors; and
mapping one or more elements of the environment by detecting and registering the one or more elements from the environment.

185. The method of embodiment 180, wherein the 3D video has a video file format comprising control data, wherein the control data instructs a video player to display the portion of the 3D video onto the one or more objects identified from the environment.

185a. The method of embodiment 185, wherein the control data comprise a set of control commands for controlling objects and functions within the 3D video and external to the 3D video.

185b. The method of embodiment 185a, wherein the control commands (e.g., the set of control commands) is at least one of: extensible, updateable, or dynamic.

185c. The method of embodiment 185b, wherein the control commands comprise at least one of: changing the speed of the 3D video, providing a user prompt for dimming lighting in user environment at a beginning of the 3D video, dialing a pizza restaurant at a beginning of the 3D video, or playing the 3D video differently based at least in part on a user's eye gaze.

185d. The method of embodiment 180, wherein the 3D video is a 3D movie, the 3D movie comprising programming language 186. A virtual and/or augmented reality display system comprising:
a camera to capture a virtual and/or augmented reality environment; and
a module for processing data, wherein the module is stored in a memory, the module when executed, performs a process of:
identifying a 3D video, receiving, from one or more sensors, environment information of a user environment, the environment information identifying objects within the environment, and rendering a portion of the 3D video onto one or more objects identified from the environment.

187. The virtual and/or augmented reality display system of embodiment 186, wherein the 3D video is a stereoscopic 3D video.

188. The virtual and/or augmented reality display system of embodiment 186, wherein the 3D video has a video file format comprising control data, wherein the control data instructs a video player to render portions of the 3D video based at least in part on the decisions elected by the user.

189. The virtual and/or augmented reality display system of embodiment 186, wherein the one or more interactions received from the user comprise at least one of a head pose, an eye-tracking, gestures, totem gestures, or object recognizer.

190. The virtual and/or augmented reality display system of embodiment 186, wherein an interaction from the one or more interactions received from the user jumps the 3D video to a different part of the 3D video.

191. A computer implemented method of displaying interactive 3D video in a virtual and/or augmented reality environment, the method comprising:

identifying a 3D video as a stream of non-executable data periodically interrupted by decision nodes;

receiving one or more interactions from a user as input corresponding to decisions elected by the user; and rendering the 3D video based at least on the decisions elected by the user.

192. The method of embodiment 191, wherein the 3D video is a stereoscopic 3D video.

193. The method of embodiment 191, wherein the 3D video has a video file format comprising control data, wherein the control data instructs a video player to render portions of the 3D video based at least in part on the decisions elected by the user.

194. The method of embodiment 191, wherein the one or more interactions received from the user comprise at least one of a head pose, an eye-tracking, gestures, totem gestures, or object recognizer.

195. The method of embodiment 191, wherein an interaction from the one or more interactions received from the user jumps the 3D video to a different part of the 3D video.

196. A virtual and/or augmented reality display system comprising:

a camera to capture a virtual and/or augmented reality environment; and a module for processing data, wherein the module is stored in a memory, the module when executed, performs a process of:

identifying a 3D video as a stream of non-executable data periodically interrupted by decision nodes, receiving one or more interactions from a user as input corresponding to decisions elected by the user, and rendering the 3D video based at least on the decisions elected by the user.

197. The virtual and/or augmented reality display system of embodiment 196, wherein the 3D video is a stereoscopic 3D video.

198. The virtual and/or augmented reality display system of embodiment 196, wherein the 3D video has a video file format comprising control data, wherein the control data instructs a video player to render portions of the 3D video based at least in part on the decisions elected by the user.

199. The virtual and/or augmented reality display system of embodiment 196, wherein the one or more interactions received from the user comprise at least one of a head pose, an eye-tracking, gestures, totem gestures, or object recognizer.

200. The virtual and/or augmented reality display system of claim 196, wherein an interaction from the one or more interactions received from the user jumps the 3D video to a different part of the 3D video.

201. A computer implemented method for displaying 3D objects, the method comprising:

storing graphical data representing a 3D object in a database;

displaying a 2D opaque pane comprising a viewing aperture for viewing the 3D object located behind the 2D opaque pane;

rendering a first portion of the 3D object viewable through the viewing aperture from a first perspective;

receiving a request to display the 3D object viewable through the viewing aperture from a second viewing perspective;

rendering a second portion of the 3D object viewable through the viewing aperture from a second perspective; and displaying the second portion of the 3D object from the second perspective.

202. The method of embodiment 201, wherein the graphical data representing the 3D object is a complete representation of the entire 3D object.

203. The method of embodiment 201, wherein the rendering of the first portion of the 3D object is based at least in part on a viewing angle relative to a field of view of the 3D object from the first perspective.

204. The method of embodiment 201, wherein the rendering of the second portion of the 3D object is based at least in part on a viewing angle relative to a field of view of the 3D object from the second perspective.

205. The method of embodiment 201, wherein the opaque pane further comprises a plurality of viewing aperture for viewing a plurality of 3D objects located behind the 2D opaque pane.

206. The method of embodiment 205, wherein each 3D object of the plurality of 3D objects is located behind respective viewing aperture.

207. The method of embodiment 201 wherein the 3D object is a 3D icon.

208. The method of embodiment 207, wherein the 2D opaque pane comprising the viewing aperture is an icon grid for displaying a plurality of 3D icons.

209. The method of embodiment 201, wherein the 3D object moves through the viewing aperture as a user gazes at the 3D object.

210. The method of embodiment 201, wherein the 3D object is displayed as a 2D image when a user is not focusing on the 3D object.

211. A computer system for displaying 3D objects, comprising:

a computer processor to execute a set of program code instructions; and a memory to hold the program code instructions, in which the program code instructions comprises program code to perform:

storing graphical data representing a 3D object in a database;

displaying a 2D opaque pane comprising a viewing aperture for viewing the 3D object located behind the 2D opaque pane;

rendering a first portion of the 3D object viewable through the viewing aperture from a first perspective;
receiving a request to display the 3D object viewable through the viewing aperture from a second viewing perspective;
rendering a second portion of the 3D object viewable through the viewing aperture from a second perspective; and
displaying the second portion of the 3D object from the second perspective.

212. The computer system of embodiment 211, wherein the graphical data representing the 3D object is a complete representation of the entire 3D object.

213. The computer system of embodiment 211, wherein the rendering of the first portion of the 3D object is based at least in part on a viewing angle relative to a field of view of the 3D object from the first perspective.

214. The computer system of embodiment 211, wherein the rendering of the second portion of the 3D object is based at least in part on a viewing angle relative to a field of view of the 3D object from the second perspective.

215. The computer system of embodiment 211, wherein the opaque pane further comprises a plurality of viewing aperture for viewing a plurality of 3D objects located behind the 2D opaque pane.

216. The computer system of embodiment 215, wherein each 3D object of the plurality of 3D objects is located behind respective viewing aperture.

217. The computer system of embodiment 211, wherein the 3D object is a 3D icon.

218. The computer system of embodiment 217, wherein the 2D opaque pane comprising the viewing aperture is an icon grid for displaying a plurality of 3D icons.

219. The computer system of embodiment 211, wherein the 3D object moves through the viewing aperture as a user gazes at the 3D object.

220. The computer system of embodiment 211, wherein the 3D object is displayed as a 2D image when a user is not focusing on the 3D object.

221. A system, method, and computer program product for generating and displaying virtual content in a mixed reality system according to any of the inventive concepts disclosed herein.

System Architecture Overview

Figure 10:
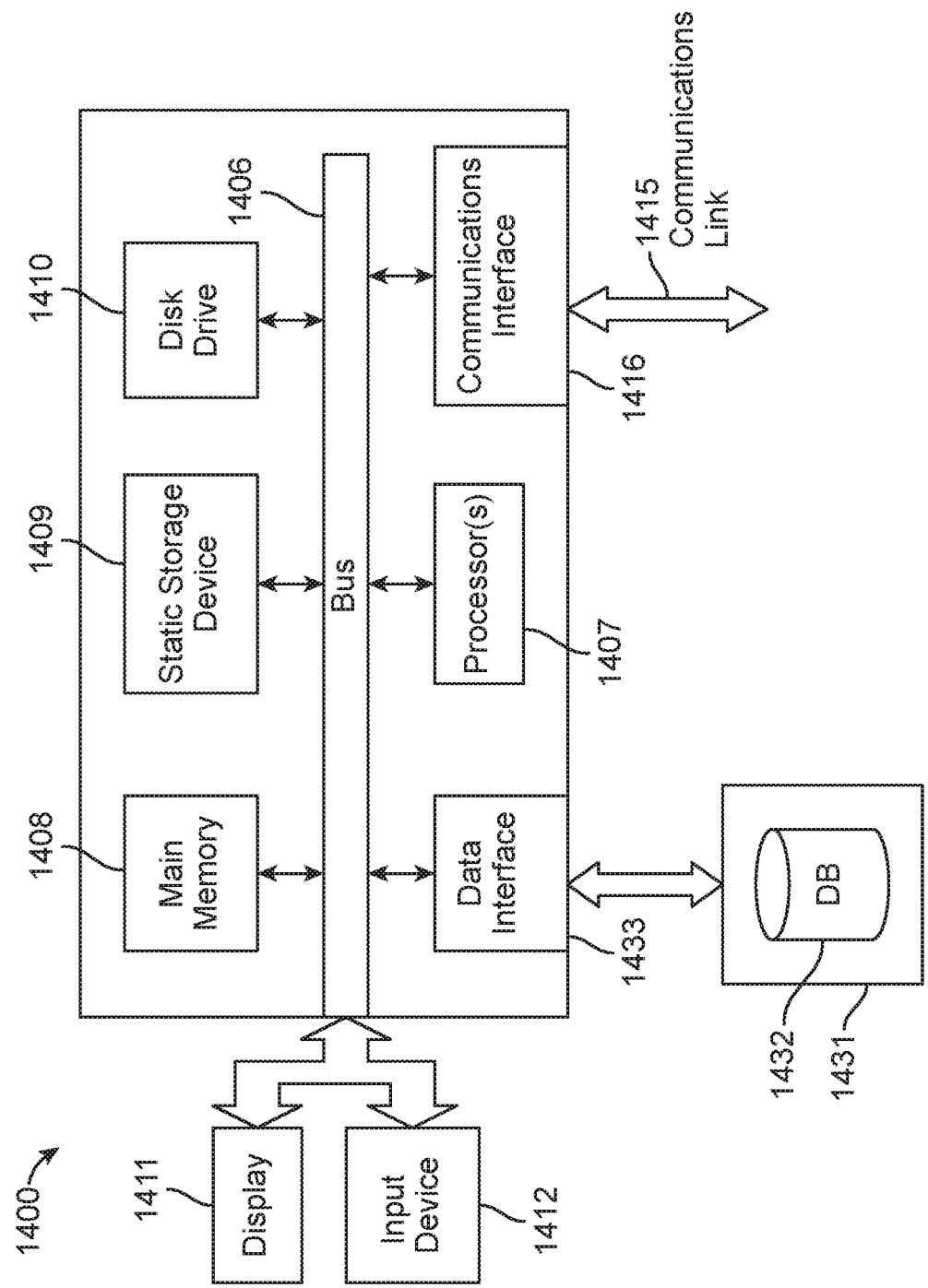
FIG. 10 is a block diagram of an illustrative computing system suitable for implementing one or more of the embodiments of the present disclosure.

FIG. 10 is a block diagram of an illustrative computing system 1400 suitable for implementing one or more of the embodiments of the present disclosure. The computing system 1400 includes a bus 1406 or other communication mechanism for communicating information, which interconnects subsystems and devices, such as a processor 1407, a main memory 1408 (e.g., RAM), a static storage device 1409 (e.g., ROM), a disk drive 1410 (e.g., magnetic or optical), a communications interface 1414 (e.g., modem or Ethernet card), a display 1411 (e.g., CRT or LCD), an input device 1412 (e.g., keyboard), and cursor control.

According to some embodiments, the computing system 1400 performs specific operations by the processor 1407 executing one or more sequences of one or more instructions contained in the main memory 1408. Such instructions may be read into the main memory 1408 from another computer readable/usable medium, such as the static storage device 1409 or the disk drive 1410. In alternative embodiments, hard-wired circuitry may be used in place of or in combination with software instructions to implement the disclosure. Thus, embodiments are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to the processor 1407 for execution. Such a medium may take many forms, including but not limited to, non-volatile media and volatile media. Non-volatile media includes, for example, optical or magnetic disks, such as the disk drive 1410. Volatile media includes dynamic memory, such as the main memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In one embodiment, execution of the sequences of instructions to practice the disclosure is performed by a single computing system 1400. According to other embodiments, two or more computing systems 1400 coupled by a communications link 1415 (e.g., LAN, PTSN, or wireless network) may perform the sequence of instructions required to practice the disclosure in coordination with one another.

The computing system 1400 may transmit and receive messages, data, and instructions, including program, e.g., application code, through the communications link 1415 via the communications interface 1414. Received program code may be executed by the processor 1407 as it is received, and/or stored in the disk drive 1410, or other non-volatile storage for later execution. The computing system 1400 may communicate through a data interface 1433 to a database 1432 on an external storage device 1431.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed is:

1. A method of displaying 3D video that extends beyond a surface of a display screen, the method comprising:
identifying a portal in an environment;
identifying a 3D (three-dimensional) video to be displayed via and through the portal, wherein
the 3D video comprises video data, audio data corresponding to the video data, an animation stream, control data corresponding to the animation stream, and
the animation stream corresponds to the audio data and the video data in the 3D video;
generating one or more 3D models corresponding to the 3D video, wherein
the animation stream corresponds to an animation instruction for a 3D model of the one or more 3D models, and
the control data includes instructions that determine when to play which portion of the animation stream;
rendering the 3D video including the one or more 3D models beyond the portal for multiple viewing positions at an appropriate trigger time along with a rendering of the 3D video so that the 3D video is perceived as a 3D representation from the multiple perspectives, wherein
the multiple perspectives are different from a first perspective at which at least a portion of the 3D video was captured.

2. The method of claim 1, further comprising:
capturing first video data for at least the portion of the 3D video for the first perspective with a first image capturing device for a first eye of a user; and
capturing second video data for the at least the portion of the 3D video for the first perspective with a second image capturing device for a second eye of the user, wherein
the user perceives the first video data and the second video data together as at least one 3D model of the one or more 3D models, and
the 3D video comprises a stereoscopic 3D video, and the portal corresponds to a display screen or a display surface of the display screen.

3. The method of claim 2, further comprising:
capturing third video data for the at least the portion of the 3D video for a second perspective with a third image capturing device for the first eye; and
capturing fourth video data for the at least the portion of the 3D video for the second perspective with a fourth image capturing device for the second eye, wherein
the user perceives the third video data and the fourth video data together as the at least one 3D model of the one or more 3D models, and
the one or more 3D models are generated with animations, and at least one of the first, the second, the third, or the fourth image capturing device comprises a virtual image capturing device.

4. The method of claim 3, further comprising displaying the animations of the at least the portion of the 3D video having the one or more 3D models outside of the display screen for the 3D video so that the at least the portion of the 3D video is perceived by the user as a 3D representation that emerges out of or goes into the display screen.

5. The method of claim 4, wherein the animations of the one or more 3D models are perceived by the user as to exit a planar surface in the 3D video and to come out into the environment in which the user is located.

6. The method of claim 4, wherein the animations of the one or more 3D models are perceived by a user as to exit a non-planar surface in the 3D video and come out into the environment in which the user is located.

7. The method of claim 1, further comprising:
rendering the one or more 3D models onto one or more video panes at a same time for the multiple perspectives, wherein at least one video pane of the one or more video panes functions as a background or a backdrop to display at least one of the one or more 3D models; and
displaying the one or more video panes at the same time for the multiple perspectives from which the one or more 3D models are perceived as 3D representations.

8. The method of claim 2, further comprising rendering and displaying at least a portion of the 3D video relative to a digital representation of a real-world environment in which the user is located, wherein the stereoscopic 3D video is displayed with the one or more 3D models.

9. The method of claim 1, rendering the 3D video comprising:
determining first depth information from the 3D video;
determining second depth information that corresponds to the first depth information; and
rendering the 3D video based at least in part upon both the first depth information and the second depth information, wherein
the first depth information is included in the 3D video,
the second depth information pertains to a display location of the portal to a user location of a user to which the 3D video is to be presented, and
a depth information is factored into the rendering of the 3D video and the one or more 3D models, the depth information comprising a distance from a user of a virtual and/or augmented reality device to the 3D video and respective one or more 3D models displayed within a virtual and/or augmented reality environment.

10. The method of claim 1, further comprising:
determining, with at least the control data, a lead-time for loading at least some of the 3D video before the at least some of the 3D video is needed by the animation stream; and
preloading, using the control data, the at least some of the 3D video based at least in part upon the lead-time, wherein the control data instructs a video player to render the one or more 3D models at the appropriate trigger time along with rendering the 3D video.

11. The method of claim 1, further comprising representing a 3D structure in the 3D video based at least in part upon homogeneity of how the 3D structure is filled, wherein the one or more 3D models are rendered based at least in part on a voxel-based or a volumetric video stream, and a separate 3D structure is rendered based at least in part upon a point-based or polygon-based video stream.

12. A display system for displaying 3D video that extends beyond a surface of a display screen, the system comprising:
an augmented reality head-mounted display system; and
one or more modules for processing data, wherein the one or more modules are stored in one or more memory, the one or more modules configured to perform a set of acts, the set of acts comprising:
identifying a portal in an environment;
identifying a 3D video (three-dimensional) video to be displayed via and through the portal, wherein;
the 3D video comprises video data, audio data corresponding to the video data, an animation stream, control data corresponding to the animation stream, and
the animation stream corresponds to the audio data and the video data in the 3D video;
generating one or more 3D models corresponding to the 3D video, wherein
the animation stream corresponds to an animation instruction for a 3D model of the one or more 3D models, and
the control data includes instructions that determine when to play which portion of the animation stream;
rendering the 3D video including the one or more 3D models beyond the portal for multiple viewing positions at an appropriate trigger time along with a rendering of the 3D video so that the 3D video is perceived as a 3D representation from the multiple perspectives, wherein
the multiple perspectives are different from a first perspective at which at least a portion of the 3D video was captured.

13. The display system of claim 12, the set of acts further comprising:
capturing first video data for at least the portion of the 3D video for the first perspective with a first image capturing device for a first eye of a user; and
capturing second video data for the at least the portion of the 3D video for the first perspective with a second image capturing device for a second eye of the user, wherein
the user perceives the first video data and the second video data together as at least one 3D model of the one or more 3D models, and
the 3D video comprises a stereoscopic 3D video, and the portal corresponds to a display screen or a display surface of the display screen.

14. The display system of claim 13, the set of acts further comprising:
capturing third video data for the at least the portion of the 3D video for a second perspective with a third image capturing device for the first eye; and
capturing fourth video data for the at least the portion of the 3D video for the second perspective with a fourth image capturing device for the second eye, wherein
the user perceives the third video data and the fourth video data together as the at least one 3D model of the one or more 3D models, and
the one or more 3D models are generated with animations, and at least one of the first, the second, the third, or the fourth image capturing device comprises a virtual image capturing device.

15. The display system of claim 14, wherein the set of acts further comprises displaying animations of the at least the portion of the 3D video having the one or more 3D models outside of the display surface for the 3D video so that the at least the portion of the 3D video is perceived by the user as a 3D representation that emerges out of or goes into the display screen.

16. The display system of claim 15, wherein the animations of the one or more 3D models are perceived by the user as to exit the planar surface in the 3D video when viewed from a second perspective and to come out into the environment in which the user is located.

17. The display system of claim 15, wherein the animations of the one or more 3D models are perceived by the user as to exit a non-planar surface in the 3D video and to come out into the environment in which the user is located.

18. The display system of claim 12, wherein the set of acts further comprises:
rendering the one or more 3D models onto one or more video panes at a same time for the multiple perspectives, wherein at least one video pane of the one or more video panes functions as a background or a backdrop to display at least one of the one or more 3D models; and
displaying the one or more video panes at the same time for the multiple perspectives from which the one or more 3D models are perceived as 3D representations.

19. The display system of claim 13, further comprising rendering and displaying at least a portion of the 3D video relative to a digital representation of a real-world environment in which the user is located, wherein the stereoscopic 3D video is displayed with the one or more 3D models.

20. The display system of claim 12, rendering the 3D video comprising:
determining first depth information from the 3D video;
determining second depth information that corresponds to the first depth information; and
rendering the 3D video based at least in part upon both the first depth information and the second depth information, wherein
the first depth information is included in the 3D video,
the second depth information pertains to a display location of the portal to a user location of a user to which the 3D video is to be presented, and
a depth information is factored into the rendering of the 3D video and the one or more 3D models, the depth information comprising a distance from a user of a virtual and/or augmented reality device to the 3D video and respective one or more 3D models displayed within a virtual and/or augmented reality environment.

21. The display system of claim 12, the set of acts further comprising:
determining, with at least the control data, a lead-time for loading at least some of the 3D video before the at least some of the 3D video is needed by the animation stream; and
preloading, using the control data, the at least some of the 3D video based at least in part upon the lead-time, wherein the control data instructs a video player to render the one or more 3D models at the appropriate trigger time along with rendering the 3D video.

22. The display system of claim 12, further comprising representing a 3D structure in the 3D video based at least in part upon homogeneity of how the 3D structure is filled, wherein the one or more 3D models are rendered based at least in part on a voxel-based or volumetric video stream, and a separate 3D structure is rendered based at least in part upon a point-based or polygon-based video stream.

* * * * *